(12) United States Patent
Halasur et al.

(10) Patent No.: US 12,472,566 B2
(45) Date of Patent: Nov. 18, 2025

(54) INDEXABLE DRILL ASSEMBLY WITH COOLANT SYSTEM

(71) Applicant: KENNAMETAL INDIA LIMITED, Bangalore (IN)

(72) Inventors: Ravi Halasur, Bangalore (IN); Mahesh Todkar, Bangalore (IN)

(73) Assignee: KENNAMETAL INDIA LTD., Bangalore (IN)

( * ) Notice: Subject to any disclaimer, the term of this patent is extended or adjusted under 35 U.S.C. 154(b) by 547 days.

(21) Appl. No.: 17/888,821

(22) Filed: Aug. 16, 2022

(65) Prior Publication Data

US 2023/0056373 A1    Feb. 23, 2023

(51) Int. Cl.
  *B23B 51/00*    (2006.01)
  *B23B 51/06*    (2006.01)
(52) U.S. Cl.
  CPC ........ *B23B 51/0008* (2022.01); *B23B 51/068* (2022.01)
(58) Field of Classification Search
  CPC .............. B23B 51/042; B23B 51/0486; B23B 51/0466; B23B 51/063; B23B 51/06; B23B 51/0493; B23B 51/066; B23B 51/068; B23B 51/0682; B23B 51/0684; B23B 51/0686; B23B 2250/12; B23B 2250/121; B23B 2250/124; Y10T 408/44; Y10T 408/45; Y10T 408/458
  See application file for complete search history.

(56) References Cited

U.S. PATENT DOCUMENTS

| 22,394 A | 12/1858 | Norman |
| 40,297 A | 10/1863 | Wakefield |
| 44,915 A | 11/1864 | Baker |
| 190,907 A | 5/1877 | Baker |

(Continued)

FOREIGN PATENT DOCUMENTS

| AT | 9431 B | 10/1902 |
| AT | 9431 U1 | 10/2007 |

(Continued)

OTHER PUBLICATIONS

Apr. 5, 2024 Foreign Office Action European Application No. EP20200189283, 7 pages.

(Continued)

*Primary Examiner* — Nicole N Ramos
(74) *Attorney, Agent, or Firm* — Christopher J. Owens

(57) ABSTRACT

An indexable drill insert includes a drill body having a central longitudinal rotational axis ($C_L$), the drill body comprising a shank portion and a fluted cutting portion, the fluted cutting portion having a front clearance face and a plurality of flutes, the fluted cutting portion includes a central insert pocket capable of receiving a central cutting insert and a peripheral insert pocket capable of receiving a peripheral cutting insert. For the central cutting insert, a central, longitudinal axis of a projection of the flute coolant exit aperture can intersect a vertical plane (PA1) having an area (A1) or a horizontal plane (PB1) having an area (A2). For the peripheral cutting insert, the central, longitudinal axis of the projection can intersect a vertical plane (PA2) having an area (A3) or a horizontal plane (PB2) having an area (A4).

9 Claims, 9 Drawing Sheets

(56) References Cited

U.S. PATENT DOCUMENTS

| | | |
|---|---|---|
| 329,600 A | 11/1885 | Silver |
| 329,660 A | 11/1885 | Lord |
| 658,216 A | 9/1900 | Munger |
| 690,093 A | 12/1901 | Beach |
| 756,339 A | 4/1904 | Down |
| 756,399 A | 4/1904 | Nichols |
| 932,071 A | 8/1909 | Urbscheit |
| 1,144,088 A | 6/1915 | Ains |
| 1,461,548 A | 7/1923 | West |
| 1,508,594 A | 9/1924 | Brubakeyr, Jr. |
| 1,508,595 A | 9/1924 | Brubaker, Jr. |
| 1,630,602 A | 5/1927 | Blanco |
| 2,158,120 A | 5/1939 | Hirschberg |
| 2,289,583 A | 7/1942 | Malone |
| 2,289,683 A | 7/1942 | Rzeppa et al. |
| 2,294,969 A | 9/1942 | Albert et al. |
| 2,325,973 A | 8/1943 | Samuel et al. |
| 2,360,385 A | 10/1944 | Anderson |
| 2,423,790 A | 7/1947 | Nelson |
| 2,786,373 A | 3/1957 | Kenneth et al. |
| 3,037,264 A | 6/1962 | Mossberg |
| 3,040,605 A | 6/1962 | Andreasson |
| 3,045,513 A | 7/1962 | Andreasson |
| 3,140,749 A | 7/1964 | Joseph et al. |
| 3,153,356 A | 10/1964 | Dearborn |
| 3,153,366 A | 10/1964 | Yasuaki |
| 3,293,727 A | 12/1966 | Simms |
| 3,359,837 A | 12/1967 | Andreasson |
| 3,410,749 A | 11/1968 | Chmiel |
| 3,434,553 A | 3/1969 | Weller et al. |
| 3,436,990 A | 4/1969 | Tourison et al. |
| 3,548,688 A | 12/1970 | Kuch |
| 3,765,496 A | 10/1973 | Flores et al. |
| 3,913,196 A | 10/1975 | Maday |
| 4,072,438 A | 2/1978 | Powers |
| 4,131,383 A * | 12/1978 | Powers ................. B23B 27/007 407/114 |
| 4,220,429 A | 9/1980 | Powers et al. |
| 4,278,373 A * | 7/1981 | Wolfe, III ........... B23B 27/1614 408/199 |
| 4,293,251 A * | 10/1981 | Anderson ................ F16L 41/12 285/190 |
| 4,293,253 A | 10/1981 | Ott |
| D262,219 S | 12/1981 | Lassiter |
| D263,598 S | 3/1982 | Lassiter |
| 4,340,327 A | 7/1982 | Martins |
| D273,387 S | 4/1984 | Lassiter |
| D273,388 S | 4/1984 | Lassiter |
| D273,389 S | 4/1984 | Lassiter |
| D273,390 S | 4/1984 | Lassiter |
| D273,391 S | 4/1984 | Lassiter |
| D273,682 S | 5/1984 | Lassiter |
| D274,436 S | 6/1984 | Lassiter |
| 4,475,851 A | 10/1984 | Hale |
| 4,507,028 A | 3/1985 | Matsushita |
| 4,556,347 A | 12/1985 | Barish |
| 4,561,812 A | 12/1985 | Linden |
| 4,563,113 A | 1/1986 | Ebenhoch |
| 4,572,714 A | 2/1986 | Suzuki et al. |
| 4,606,680 A | 8/1986 | Striegl |
| 4,642,001 A * | 2/1987 | Gill ........................ B23B 51/00 408/229 |
| 4,643,621 A | 2/1987 | Fuller, Jr. et al. |
| 4,648,760 A | 3/1987 | Karlsson et al. |
| 4,744,704 A | 5/1988 | Galvefors |
| 4,756,650 A | 7/1988 | Wakihira et al. |
| 4,844,643 A | 7/1989 | Icks |
| 4,890,963 A | 1/1990 | Keritsis |
| 4,950,108 A | 8/1990 | Roos |
| 4,990,036 A | 2/1991 | Eklund et al. |
| 5,024,563 A | 6/1991 | Randall |
| 5,114,286 A | 5/1992 | Calkins |
| 5,154,549 A | 10/1992 | Isobe et al. |
| 5,154,550 A | 10/1992 | Isobe et al. |
| 5,221,164 A | 6/1993 | Allaire |
| 5,228,812 A | 7/1993 | Noguchi et al. |
| 5,269,618 A | 12/1993 | Meyer |
| 5,304,181 A | 4/1994 | Caspari et al. |
| 5,312,209 A | 5/1994 | Lindblom |
| 5,340,246 A | 8/1994 | Tukala |
| 5,346,335 A | 9/1994 | Harpaz et al. |
| 5,350,261 A | 9/1994 | Takaya et al. |
| 5,354,156 A | 10/1994 | Von Haas et al. |
| 5,382,121 A | 1/1995 | Bicknell |
| 5,429,199 A | 7/1995 | Sheirer et al. |
| 5,452,971 A | 9/1995 | Nevills |
| 5,478,176 A | 12/1995 | Stedt et al. |
| 5,503,509 A | 4/1996 | Von Haas et al. |
| 5,509,761 A | 4/1996 | Grossman et al. |
| 5,584,617 A | 12/1996 | Houser |
| 5,597,271 A | 1/1997 | Men et al. |
| 5,622,461 A * | 4/1997 | Tukala ................... B23C 5/202 408/233 |
| 5,630,681 A | 5/1997 | Paya |
| 5,634,747 A | 6/1997 | Tukala et al. |
| 5,649,794 A | 7/1997 | Kress et al. |
| 5,678,960 A | 10/1997 | Just et al. |
| 5,685,671 A | 11/1997 | Packer et al. |
| 5,704,740 A | 1/1998 | Ebenhoch et al. |
| 5,769,577 A | 6/1998 | Boddy |
| 5,791,838 A | 8/1998 | Hamilton |
| 5,800,101 A | 9/1998 | Jindai et al. |
| 5,807,031 A | 9/1998 | Arai et al. |
| 5,863,162 A | 1/1999 | Karlsson et al. |
| 5,890,853 A | 4/1999 | Hiranaka |
| 5,901,455 A | 5/1999 | Leitenberger et al. |
| 5,904,455 A | 5/1999 | Krenzer et al. |
| 5,947,653 A * | 9/1999 | Hamberg ............ B23B 51/0493 408/230 |
| 5,954,459 A | 9/1999 | Noguchi et al. |
| 5,957,631 A | 9/1999 | Hecht |
| 5,971,672 A | 10/1999 | Hansson |
| 5,971,673 A | 10/1999 | Berglund et al. |
| 5,971,676 A | 10/1999 | Kojima |
| 5,980,166 A | 11/1999 | Ogura |
| 5,988,953 A | 11/1999 | Berglund et al. |
| 5,996,714 A | 12/1999 | Massa et al. |
| 6,000,000 A | 12/1999 | Hawkins et al. |
| 6,012,881 A | 1/2000 | Scheer |
| 6,019,553 A | 2/2000 | Yakamavich, Jr. |
| 6,030,155 A | 2/2000 | Scheer et al. |
| 6,039,515 A | 3/2000 | Lamberg |
| 6,045,301 A | 4/2000 | Kammermeier et al. |
| 6,045,305 A | 4/2000 | Plummer |
| 6,050,754 A | 4/2000 | Thomas |
| 6,059,492 A | 5/2000 | Hecht |
| 6,071,045 A | 6/2000 | Janness |
| 6,109,841 A | 8/2000 | Johne |
| 6,116,825 A | 9/2000 | Kammermeier et al. |
| 6,123,488 A | 9/2000 | Kasperik et al. |
| 6,132,149 A | 10/2000 | Howarth et al. |
| 6,168,355 B1 | 1/2001 | Wardell |
| 6,186,705 B1 | 2/2001 | Kumar et al. |
| 6,190,097 B1 | 2/2001 | Thomas |
| 6,210,083 B1 | 4/2001 | Kammermeier et al. |
| 6,257,807 B1 | 7/2001 | Heinloth |
| 6,261,034 B1 | 7/2001 | Cselle |
| 6,267,541 B1 | 7/2001 | Isakov et al. |
| 6,276,879 B1 | 8/2001 | Hecht |
| 6,283,682 B1 | 9/2001 | Plummer |
| 6,439,811 B1 | 8/2002 | Wardell |
| 6,443,674 B1 | 9/2002 | Jaconi |
| 6,447,218 B1 | 9/2002 | Lagerberg |
| 6,481,938 B2 | 11/2002 | Widin |
| 6,485,235 B1 | 11/2002 | Mast et al. |
| 6,506,003 B1 | 1/2003 | Erickson |
| 6,514,019 B1 | 2/2003 | Schulz |
| 6,524,034 B2 | 2/2003 | Eng et al. |
| 6,527,486 B2 * | 3/2003 | Wiman ................... B23B 51/00 408/188 |
| 6,530,728 B2 | 3/2003 | Eriksson |
| 6,543,970 B1 | 4/2003 | Qvarth et al. |
| 6,582,164 B1 | 6/2003 | McCormick |
| 6,582,184 B2 | 6/2003 | Little, Jr. |

(56) References Cited

U.S. PATENT DOCUMENTS

| | | |
|---|---|---|
| 6,585,460 B1 | 7/2003 | Meece et al. |
| 6,595,305 B1 | 7/2003 | Dunn et al. |
| 6,595,727 B2 | 7/2003 | Arvidsson |
| 6,626,614 B2 | 9/2003 | Nakamura |
| 6,648,561 B2 | 11/2003 | Kraemer |
| 6,652,203 B1 | 11/2003 | Risen, Jr. |
| 6,821,061 B2 | 11/2004 | Frejd |
| 6,840,717 B2 | 1/2005 | Eriksson |
| 6,948,891 B2 | 9/2005 | Roman |
| 7,008,150 B2 | 3/2006 | Krenzer |
| 7,048,480 B2 | 5/2006 | Borschert et al. |
| 7,070,367 B2 | 7/2006 | Krenzer |
| 7,101,125 B2 | 9/2006 | Borschert et al. |
| 7,114,892 B2 | 10/2006 | Hansson |
| 7,125,207 B2 | 10/2006 | Craig et al. |
| 7,134,816 B2 | 11/2006 | Brink |
| 7,189,437 B2 | 3/2007 | Kidd et al. |
| 7,198,437 B2 | 4/2007 | Jonsson |
| 7,201,542 B2 | 4/2007 | Fritsch et al. |
| 7,237,985 B2 | 7/2007 | Leuze et al. |
| 7,296,497 B2 | 11/2007 | Kugelberg et al. |
| 7,306,410 B2 | 12/2007 | Borschert et al. |
| 7,309,196 B2 | 12/2007 | Ruy Frota de Souza |
| 7,311,480 B2 | 12/2007 | Heule et al. |
| 7,360,974 B2 | 4/2008 | Borschert et al. |
| 7,377,730 B2 | 5/2008 | Hecht et al. |
| 7,407,350 B2 | 8/2008 | Hecht et al. |
| 7,431,543 B2 | 10/2008 | Buettiker et al. |
| 7,467,915 B2 | 12/2008 | De Souza, Filho |
| 7,476,067 B2 | 1/2009 | Borschert et al. |
| 7,559,382 B2 | 7/2009 | Koch |
| 7,591,617 B2 | 9/2009 | Borschert et al. |
| D607,024 S | 12/2009 | Dost et al. |
| 7,625,161 B1 | 12/2009 | Ruy Frota de Souza |
| 7,677,842 B2 | 3/2010 | Park |
| 7,740,427 B2 | 6/2010 | Heule et al. |
| 7,740,472 B2 | 6/2010 | Delamarche et al. |
| 7,775,751 B2 | 8/2010 | Hecht et al. |
| 7,832,967 B2 | 11/2010 | Borschert et al. |
| D632,320 S | 2/2011 | Chen et al. |
| D633,534 S | 3/2011 | Chen et al. |
| 7,972,094 B2 | 7/2011 | Men et al. |
| RE42,644 E | 8/2011 | Jonsson |
| 7,997,832 B2 | 8/2011 | Prichard et al. |
| 7,997,836 B2 | 8/2011 | Kim et al. |
| 8,007,202 B2 | 8/2011 | Davis et al. |
| 8,007,207 B2 | 8/2011 | Rimet |
| 8,007,208 B2 | 8/2011 | Noureddine |
| 8,021,087 B2 * | 9/2011 | Choi .............. B23B 29/04 408/199 |
| 8,021,088 B2 | 9/2011 | Hecht |
| 8,142,116 B2 | 3/2012 | Frejd |
| D668,697 S | 10/2012 | Hsu |
| D669,923 S | 10/2012 | Watson et al. |
| 8,366,358 B2 | 2/2013 | Borschert et al. |
| 8,376,669 B2 | 2/2013 | Jaeger et al. |
| 8,430,609 B2 | 4/2013 | Frejd |
| 8,449,227 B2 | 5/2013 | Danielsson |
| 8,454,274 B2 | 6/2013 | Chen et al. |
| 8,534,966 B2 | 9/2013 | Hecht |
| 8,556,552 B2 | 10/2013 | Hecht |
| 8,596,935 B2 | 12/2013 | Fang et al. |
| 8,651,778 B2 | 2/2014 | Okumura |
| 8,678,722 B2 | 3/2014 | Aare |
| 8,678,723 B2 | 3/2014 | Osawa et al. |
| 8,696,252 B2 * | 4/2014 | Bonnarang .............. B23C 5/28 407/11 |
| RE44,915 E | 5/2014 | De Souza |
| 8,721,235 B2 | 5/2014 | Kretzschmann et al. |
| D708,034 S | 7/2014 | Huang |
| 8,784,018 B2 | 7/2014 | Päbel |
| 8,784,019 B2 | 7/2014 | Pabel |
| D711,719 S | 8/2014 | DeBaker |
| 8,807,888 B2 | 8/2014 | Borschert et al. |
| 8,882,413 B2 | 11/2014 | Hecht |
| 8,926,234 B2 | 1/2015 | Engström et al. |
| 8,931,982 B2 | 1/2015 | Osawa et al. |
| 8,939,685 B2 | 1/2015 | Cigni |
| 8,992,142 B2 | 3/2015 | Hecht |
| 9,028,180 B2 | 5/2015 | Hecht |
| 9,050,659 B2 | 6/2015 | Schwaegerl et al. |
| 9,073,128 B2 | 7/2015 | Mack et al. |
| 9,079,255 B2 | 7/2015 | Jager et al. |
| 9,162,295 B2 | 10/2015 | Pabel et al. |
| 9,168,589 B2 | 10/2015 | Ramesh |
| D742,714 S | 11/2015 | King, Jr. et al. |
| D742,948 S | 11/2015 | Kenno et al. |
| 9,180,650 B2 | 11/2015 | Fang et al. |
| 9,205,498 B2 | 12/2015 | Jaeger |
| 9,221,108 B2 * | 12/2015 | Bae .............. B23B 51/00 |
| 9,248,512 B2 | 2/2016 | Aare |
| 9,272,335 B2 | 3/2016 | Ramesh |
| 9,296,049 B2 | 3/2016 | Schwaegerl et al. |
| 9,302,332 B2 | 4/2016 | Scanlon et al. |
| 9,370,825 B2 | 6/2016 | Ramesh |
| 9,371,701 B2 | 6/2016 | Cox et al. |
| 9,481,040 B2 | 11/2016 | Schwaegerl et al. |
| 9,498,829 B2 | 11/2016 | Zabrosky |
| D798,921 S | 10/2017 | Frota De Souza Filho |
| D798,922 S | 10/2017 | Frota De Souza Filho et al. |
| 9,782,844 B2 | 10/2017 | Ogata |
| 10,207,339 B2 | 2/2019 | Park et al. |
| 10,213,845 B2 | 2/2019 | Schwagerl et al. |
| 2001/0033779 A1 | 10/2001 | Wiman et al. |
| 2001/0033780 A1 | 10/2001 | Berglund et al. |
| 2002/0057951 A1 | 5/2002 | Silver |
| 2002/0061235 A1 | 5/2002 | Maier |
| 2002/0102141 A1 | 8/2002 | Meece et al. |
| 2002/0141842 A1 | 10/2002 | Tsuzaka et al. |
| 2002/0159851 A1 | 10/2002 | Krenzer |
| 2002/0168239 A1 | 11/2002 | Mast et al. |
| 2002/0172569 A1 | 11/2002 | Nakamura |
| 2002/0195279 A1 | 12/2002 | Bise et al. |
| 2003/0039523 A1 | 2/2003 | Kemmer |
| 2003/0060133 A1 | 3/2003 | Junker |
| 2003/0091402 A1 | 5/2003 | Lindblom |
| 2003/0161696 A1 | 8/2003 | Fritsch et al. |
| 2003/0175086 A1 | 9/2003 | Muhlfriedel et al. |
| 2003/0180103 A1 | 9/2003 | Nagaya et al. |
| 2003/0185640 A1 | 10/2003 | Ito |
| 2003/0219321 A1 | 11/2003 | Borschert et al. |
| 2003/0223832 A1 | 12/2003 | Roman et al. |
| 2003/0223833 A1 | 12/2003 | Roman |
| 2004/0042859 A1 | 3/2004 | Edvardsson et al. |
| 2004/0067115 A1 | 4/2004 | Yamamoto |
| 2004/0096281 A1 | 5/2004 | Sherman et al. |
| 2004/0101379 A1 | 5/2004 | Mabuchi et al. |
| 2004/0240944 A1 | 12/2004 | Pachao-Morbitzer et al. |
| 2005/0047951 A1 | 3/2005 | Gronquist et al. |
| 2005/0084352 A1 | 4/2005 | Borschert et al. |
| 2005/0111928 A1 | 5/2005 | Stanarius et al. |
| 2005/0135888 A1 | 6/2005 | Stokey et al. |
| 2005/0244235 A1 | 11/2005 | Kleiner |
| 2005/0260049 A1 | 11/2005 | Kruszynski et al. |
| 2006/0006576 A1 | 1/2006 | Karos |
| 2006/0027046 A1 | 2/2006 | Kugelberg et al. |
| 2006/0072976 A1 | 4/2006 | Frota |
| 2006/0093449 A1 | 5/2006 | Hecht et al. |
| 2006/0171787 A1 | 8/2006 | Lindblom |
| 2006/0204345 A1 | 9/2006 | Borschert et al. |
| 2006/0260439 A1 | 11/2006 | Tubinger et al. |
| 2006/0288820 A1 | 12/2006 | Mirchandani et al. |
| 2007/0201962 A1 | 8/2007 | Limell et al. |
| 2008/0003072 A1 | 1/2008 | Kim et al. |
| 2008/0075547 A1 | 3/2008 | Wolf et al. |
| 2008/0170921 A1 | 7/2008 | Sjoo |
| 2008/0175676 A1 | 7/2008 | Prichard et al. |
| 2008/0175677 A1 | 7/2008 | Prichard et al. |
| 2008/0181737 A1 | 7/2008 | Limell et al. |
| 2008/0181741 A1 | 7/2008 | Borschert et al. |
| 2008/0193231 A1 | 8/2008 | Jonsson et al. |
| 2008/0193237 A1 | 8/2008 | Men et al. |
| 2008/0219791 A1 | 9/2008 | Nasu et al. |
| 2008/0304925 A1 | 12/2008 | Meyer et al. |

(56) References Cited

U.S. PATENT DOCUMENTS

| | | |
|---|---|---|
| 2009/0044986 A1 | 2/2009 | Jaeger et al. |
| 2009/0067942 A1 | 3/2009 | Tanaka |
| 2009/0071723 A1 | 3/2009 | Mergenthaler et al. |
| 2009/0116920 A1 | 5/2009 | Bae |
| 2009/0123244 A1 | 5/2009 | Buettiker et al. |
| 2009/0238649 A1 | 9/2009 | Kruszynski et al. |
| 2009/0245949 A1 | 10/2009 | Takahashi et al. |
| 2009/0311055 A1 | 12/2009 | Galota et al. |
| 2009/0311060 A1 | 12/2009 | Frejd |
| 2010/0021253 A1 | 1/2010 | Frejd |
| 2010/0034606 A1 | 2/2010 | Nasu et al. |
| 2010/0034607 A1 | 2/2010 | Meyer et al. |
| 2010/0061821 A1 | 3/2010 | Okumura |
| 2010/0092259 A1 | 4/2010 | Borschert et al. |
| 2010/0143059 A1 | 6/2010 | Hecht |
| 2010/0150673 A1 | 6/2010 | Schneider et al. |
| 2010/0178122 A1 | 7/2010 | Bae |
| 2010/0247255 A1 | 9/2010 | Nitzsche et al. |
| 2010/0266357 A1 | 10/2010 | Kretzschmann et al. |
| 2010/0272526 A1 | 10/2010 | Dufour et al. |
| 2010/0272529 A1 | 10/2010 | Rozzi et al. |
| 2010/0272531 A1 | 10/2010 | Shavit |
| 2010/0296884 A1 | 11/2010 | Okumura |
| 2010/0307837 A1 | 12/2010 | King et al. |
| 2010/0322723 A1 | 12/2010 | Danielsson |
| 2010/0322728 A1 | 12/2010 | Aare |
| 2010/0322729 A1 | 12/2010 | Pabel |
| 2010/0322731 A1 | 12/2010 | Aare |
| 2010/0322732 A1 | 12/2010 | Mergenthaler et al. |
| 2010/0329804 A1 | 12/2010 | Okumura |
| 2011/0020072 A1 | 1/2011 | Chen et al. |
| 2011/0020073 A1 | 1/2011 | Chen et al. |
| 2011/0020077 A1 | 1/2011 | Fouquer |
| 2011/0020086 A1 | 1/2011 | Borschert et al. |
| 2011/0027021 A1 | 2/2011 | Nelson et al. |
| 2011/0081212 A1 | 4/2011 | Spichtinger et al. |
| 2011/0097168 A1 | 4/2011 | Jager et al. |
| 2011/0110735 A1 | 5/2011 | Klettenheimer et al. |
| 2011/0110739 A1 | 5/2011 | Frisendahl |
| 2011/0168453 A1 | 7/2011 | Kersten et al. |
| 2011/0229277 A1 | 9/2011 | Hoffer et al. |
| 2011/0236145 A1 | 9/2011 | Paebel et al. |
| 2011/0268518 A1 | 11/2011 | Sampath et al. |
| 2011/0299944 A1 | 12/2011 | Hofermann |
| 2011/0318128 A1 | 12/2011 | Schwagerl et al. |
| 2012/0003056 A1 | 1/2012 | Jaeger |
| 2012/0014760 A1 | 1/2012 | Glimpel et al. |
| 2012/0082518 A1 | 4/2012 | Woodruff et al. |
| 2012/0087746 A1 | 4/2012 | Fang et al. |
| 2012/0087747 A1 | 4/2012 | Fang et al. |
| 2012/0099937 A1 | 4/2012 | Osawa et al. |
| 2012/0114438 A1 | 5/2012 | Schwenck et al. |
| 2012/0121347 A1 | 5/2012 | Osawa et al. |
| 2012/0288337 A1 | 11/2012 | Sampath |
| 2012/0308319 A1 | 12/2012 | Sampath et al. |
| 2012/0315101 A1 | 12/2012 | Osawa et al. |
| 2013/0022422 A1 | 1/2013 | Ramesh |
| 2013/0022423 A1 | 1/2013 | Ramesh |
| 2013/0129435 A1 | 5/2013 | Ortlund et al. |
| 2013/0183107 A1 | 7/2013 | Fang et al. |
| 2013/0183112 A1 | 7/2013 | Schwagerl et al. |
| 2013/0209189 A1 | 8/2013 | Borschert et al. |
| 2013/0223943 A1 | 8/2013 | Gey et al. |
| 2013/0243537 A1 | 9/2013 | Ogata |
| 2013/0259590 A1 | 10/2013 | Shaheen |
| 2013/0266389 A1 | 10/2013 | Hecht |
| 2013/0302101 A1 | 11/2013 | Scanlon et al. |
| 2013/0315684 A1 | 11/2013 | Ramesh |
| 2013/0320638 A1 | 12/2013 | Dejonghe et al. |
| 2014/0023449 A1 | 1/2014 | Jonsson et al. |
| 2014/0030037 A1* | 1/2014 | Jensen .................. B23B 27/10 408/60 |
| 2014/0133931 A1 | 5/2014 | Bae |
| 2014/0161552 A1 | 6/2014 | Ramesh |
| 2014/0169892 A1 | 6/2014 | Hecht |
| 2014/0212235 A1 | 7/2014 | Prast et al. |
| 2014/0255115 A1 | 9/2014 | Zabrosky |
| 2014/0255116 A1 | 9/2014 | Myers et al. |
| 2014/0260808 A1 | 9/2014 | Sweetman et al. |
| 2014/0286719 A1 | 9/2014 | Ramesh |
| 2014/0301799 A1 | 10/2014 | Schwaegerl et al. |
| 2014/0321931 A1 | 10/2014 | Gey |
| 2014/0348602 A1 | 11/2014 | Schwaegerl et al. |
| 2015/0063926 A1 | 3/2015 | Wu et al. |
| 2015/0063931 A1 | 3/2015 | Wu et al. |
| 2015/0104266 A1 | 4/2015 | Guter |
| 2015/0174671 A1 | 6/2015 | Maurer |
| 2015/0266107 A1 | 9/2015 | Gonen et al. |
| 2015/0273597 A1 | 10/2015 | Aliaga et al. |
| 2015/0298220 A1 | 10/2015 | Ach et al. |
| 2015/0321267 A1 | 11/2015 | Takai |
| 2015/0328696 A1 | 11/2015 | Wang et al. |
| 2015/0360302 A1 | 12/2015 | Guter |
| 2016/0001379 A1 | 1/2016 | Kauper |
| 2016/0001381 A1 | 1/2016 | Lach |
| 2016/0016236 A1 | 1/2016 | Evans |
| 2016/0023282 A1 | 1/2016 | Ramesh |
| 2016/0031016 A1 | 2/2016 | Takai |
| 2016/0059323 A1 | 3/2016 | Riester |
| 2016/0207122 A1 | 7/2016 | Chen |
| 2016/0229017 A1 | 8/2016 | Guy |
| 2016/0263663 A1 | 9/2016 | Schwaegerl et al. |
| 2016/0263664 A1 | 9/2016 | Son et al. |
| 2016/0263666 A1 | 9/2016 | Myers et al. |
| 2016/0297011 A1 | 10/2016 | Park et al. |
| 2016/0311035 A1 | 10/2016 | Peng et al. |
| 2017/0001248 A1 | 1/2017 | Ramesh |
| 2017/0028480 A1 | 2/2017 | Schwagerl et al. |
| 2017/0100784 A1 | 4/2017 | Frota De Souza Filho et al. |
| 2018/0029141 A1 | 2/2018 | Ishi |
| 2018/0111205 A1 | 4/2018 | Ishi |
| 2018/0133809 A1 | 5/2018 | Brunner |
| 2018/0272442 A1 | 9/2018 | Jäger |
| 2020/0238397 A1 | 7/2020 | No |
| 2020/0391299 A1 | 12/2020 | Halasur et al. |
| 2021/0046555 A1 | 2/2021 | Todkar |
| 2021/0114123 A1* | 4/2021 | Fang .................. B23C 5/28 |

FOREIGN PATENT DOCUMENTS

| | | |
|---|---|---|
| BR | PI0412870 A | 10/2006 |
| BR | PI0412870 B1 | 8/2017 |
| CN | 1147779 A | 4/1997 |
| CN | 1160370 A | 9/1997 |
| CN | 1197709 A | 11/1998 |
| CN | 1204976 A | 1/1999 |
| CN | 1251327 A | 4/2000 |
| CN | 1258240 A | 6/2000 |
| CN | 1066656 C | 6/2001 |
| CN | 2438535 Y | 7/2001 |
| CN | 2481440 Y | 3/2002 |
| CN | 1616170 A | 5/2005 |
| CN | 1655899 A | 8/2005 |
| CN | 1655900 A | 8/2005 |
| CN | 1689740 A | 11/2005 |
| CN | 1692998 A | 11/2005 |
| CN | 1798623 A | 7/2006 |
| CN | 101048251 A | 10/2007 |
| CN | 101301688 A | 11/2008 |
| CN | 100455390 C | 1/2009 |
| CN | 101549413 A | 10/2009 |
| CN | 101605622 A | 12/2009 |
| CN | 101610866 A | 12/2009 |
| CN | 201505750 U | 6/2010 |
| CN | 102006958 A | 4/2011 |
| CN | 102015171 A | 4/2011 |
| CN | 102159350 A | 8/2011 |
| CN | 102307693 A | 1/2012 |
| CN | 102310214 A | 1/2012 |
| CN | 102438789 A | 5/2012 |
| CN | 102886551 A | 1/2013 |
| CN | 103128117 A | 6/2013 |
| CN | 103447591 A | 12/2013 |
| CN | 103702789 A | 4/2014 |

(56) References Cited

FOREIGN PATENT DOCUMENTS

| | | |
|---|---|---|
| CN | 104096884 A | 10/2014 |
| CN | 104203468 A | 12/2014 |
| CN | 104588739 A | 5/2015 |
| CN | 204321258 U | 5/2015 |
| CN | 104759664 A | 7/2015 |
| CN | 204545517 U | 8/2015 |
| CN | 204565232 U | 8/2015 |
| CN | 204584366 U | 8/2015 |
| CN | 105209198 A | 12/2015 |
| CN | 106163711 A | 11/2016 |
| CN | 106825693 A | 6/2017 |
| CN | 107107208 A | 8/2017 |
| CN | 107249796 A | 10/2017 |
| DE | 94340 C | 10/1897 |
| DE | 367010 C | 1/1923 |
| DE | 384720 C | 11/1923 |
| DE | 524677 C | 5/1931 |
| DE | 829568 C | 1/1952 |
| DE | 1106144 B | 5/1961 |
| DE | 2246965 A1 | 4/1974 |
| DE | 3133488 A1 | 3/1983 |
| DE | 8303470 U1 | 9/1983 |
| DE | 3306209 A1 | 8/1984 |
| DE | 3314349 A1 | 10/1984 |
| DE | 3545586 A1 | 7/1987 |
| DE | 3733298 A1 | 4/1989 |
| DE | 3733298 C2 | 4/1992 |
| DE | 3133488 C3 | 7/1994 |
| DE | 4314868 A1 | 11/1994 |
| DE | 19605157 A1 | 9/1996 |
| DE | 19543233 A1 | 5/1997 |
| DE | 29722002 U1 | 2/1998 |
| DE | 29809638 U1 | 8/1998 |
| DE | 19945097 A1 | 3/2001 |
| DE | 20111666 U1 | 11/2001 |
| DE | 10054850 A1 | 5/2002 |
| DE | 20204848 U1 | 6/2002 |
| DE | 20204818 U1 | 9/2002 |
| DE | 10157450 A1 | 6/2003 |
| DE | 10333340 A1 | 2/2005 |
| DE | 102004022747 A1 | 11/2005 |
| DE | 102007044095 A1 | 3/2009 |
| DE | 112009002001 T5 | 2/2013 |
| DE | 102012200690 A1 | 7/2013 |
| DE | 102013200680 A1 | 7/2013 |
| DE | 102012212146 A1 | 1/2014 |
| DE | 102013205889 B3 | 5/2014 |
| DE | 102013209371 A1 | 11/2014 |
| DE | 102014206796 A1 | 10/2015 |
| DE | 102015213016 A1 | 1/2016 |
| DE | 102015106374 A1 | 10/2016 |
| EP | 0054913 A2 | 6/1982 |
| EP | 0055142 A2 | 6/1982 |
| EP | 0118806 A1 | 9/1984 |
| EP | 0118806 B1 | 11/1987 |
| EP | 0589333 A1 | 3/1994 |
| EP | 0599393 A1 | 6/1994 |
| EP | 0599393 B1 | 2/1996 |
| EP | 0750960 A1 | 1/1997 |
| EP | 0813459 A1 | 12/1997 |
| EP | 0652813 B1 | 1/1999 |
| EP | 0750960 B1 | 8/1999 |
| EP | 1100642 A1 | 5/2001 |
| EP | 1136161 A1 | 9/2001 |
| EP | 0790092 B1 | 1/2002 |
| EP | 0813459 B1 | 7/2003 |
| EP | 1996358 A1 | 12/2008 |
| EP | 1476269 B1 | 10/2009 |
| EP | 2361708 A1 | 8/2011 |
| EP | 1996358 B1 | 11/2011 |
| EP | 2524755 A2 | 11/2012 |
| EP | 2551046 A1 | 1/2013 |
| FR | 907980 A | 3/1946 |
| FR | 2371263 A1 | 6/1978 |
| FR | 2829715 A1 | 3/2003 |
| GB | 191517961 A | 12/1915 |
| GB | 1395855 A | 5/1975 |
| GB | 1396855 A | 6/1975 |
| GB | 2010708 A | 7/1979 |
| GB | 2310622 A | 9/1997 |
| JP | S5537209 A | 3/1980 |
| JP | S57107718 A | 7/1982 |
| JP | S6094211 A | 5/1985 |
| JP | S60109806 U | 7/1985 |
| JP | S61141008 U | 9/1986 |
| JP | S61226209 A | 10/1986 |
| JP | S62213911 A | 9/1987 |
| JP | S63109908 A | 5/1988 |
| JP | H03117532 A | 5/1991 |
| JP | H03142117 A | 6/1991 |
| JP | H03184707 A | 8/1991 |
| JP | H04244311 A | 9/1992 |
| JP | H05301104 A | 11/1993 |
| JP | H069813 U | 2/1994 |
| JP | H06320323 A | 11/1994 |
| JP | H09309017 A | 12/1997 |
| JP | H1119812 A | 1/1999 |
| JP | 2000198010 A | 7/2000 |
| JP | 2002501441 A | 1/2002 |
| JP | 2002066811 A | 3/2002 |
| JP | 2002113606 A | 4/2002 |
| JP | 2002254230 A | 9/2002 |
| JP | 2003001511 A | 1/2003 |
| JP | 2003291019 A | 10/2003 |
| JP | 2003291044 A | 10/2003 |
| JP | 2003340626 A | 12/2003 |
| JP | 2004507373 A | 3/2004 |
| JP | 2004255533 A | 9/2004 |
| JP | 2005118940 A | 5/2005 |
| JP | 2005169542 A | 6/2005 |
| JP | 2005169590 A | 6/2005 |
| JP | 2005169642 A | 6/2005 |
| JP | 2006167871 A | 6/2006 |
| JP | 2008500195 A | 1/2008 |
| JP | 2008517787 A | 5/2008 |
| JP | 2008207283 A | 9/2008 |
| JP | 2009178787 A | 8/2009 |
| JP | 2010099778 A | 5/2010 |
| JP | 2011036977 A | 2/2011 |
| JP | 2015024479 A | 2/2015 |
| JP | 6211769 B2 | 10/2017 |
| KR | 20080000544 A | 1/2008 |
| KR | 101014027 B1 | 2/2011 |
| KR | 20190021592 A | 3/2019 |
| RU | 1774904 A3 | 11/1992 |
| SE | 9203716 L | 6/1994 |
| SE | 9701494 L | 2/1999 |
| SE | 0201587 L | 11/2003 |
| SE | 0201588 L | 11/2003 |
| SE | 0402760 L | 5/2006 |
| SE | 0500234 L | 8/2006 |
| SE | 1350624 A1 | 11/2013 |
| SU | 562389 A1 | 6/1977 |
| SU | 921707 A1 | 4/1982 |
| WO | WO-8403241 A1 | 8/1984 |
| WO | WO-9412305 A1 | 6/1994 |
| WO | WO-9627469 A1 | 9/1996 |
| WO | WO-9810881 A1 | 3/1998 |
| WO | WO-9853943 A1 | 12/1998 |
| WO | WO-0007761 A1 | 2/2000 |
| WO | WO-0108840 A1 | 2/2001 |
| WO | WO-03031104 A1 | 4/2003 |
| WO | WO-03047797 A1 | 6/2003 |
| WO | WO-2007107294 A1 | 9/2007 |
| WO | WO-2008072840 A2 | 6/2008 |
| WO | WO-2008099378 A1 | 8/2008 |
| WO | WO-2009128775 A1 | 10/2009 |
| WO | WO-2010102793 A1 | 9/2010 |
| WO | WO-2014091477 A1 | 6/2014 |
| WO | 2014192798 A1 | 12/2014 |
| WO | WO-2015064904 A1 | 5/2015 |

(56) References Cited

FOREIGN PATENT DOCUMENTS

| WO | WO-2015165872 A1 | 11/2015 |
|---|---|---|
| WO | WO-2019039724 A1 | 2/2019 |

OTHER PUBLICATIONS

Nov. 15, 2023 Notice of Allowance for U.S. Appl. No. 16/898,641, 4 pages.
May 9, 2012 Non-Final Office Action U.S. Appl. No. 12/847,216, 13 Pages.
Nov. 2, 2012 Notice of Allowance U.S. Appl. No. 12/847,216, 6 Pages.
Dec. 24, 2013 Non-Final Office Action U.S. Appl. No. 13/756,990, 14 Pages.
Apr. 16, 2014 Notice of Allowance U.S. Appl. No. 13/756,990, 5 Pages.
May 13, 2014 German Office Action DE Application No. 102013209371.3, 12 Pages.
Jul. 7, 2015 Office Action (3 months) 1 U.S. Appl. No. 14/014,643, 19 pages.
Jul. 7, 2015 Office Action (3 months) 1 U.S. Appl. No. 14/014,668, 16 pages.
Jul. 16, 2015 International Search Report Transmitted.
Sep. 2, 2015 First office action SE No. 13500285, 8 pages.
Oct. 12, 2015 First office action IL231436, 2 pages.
Oct. 12, 2015 Israel First Office Action IL Application No. 229547, 4 Pages.
Oct. 22, 2015 Office Action (3 months) 1 U.S. Appl. No. 14/243,350 (2014-0301799A1), 22 pages.
Nov. 3, 2015 Final Office Action U.S. Appl. No. 14/014,643, 17 pages.
Nov. 6, 2015 First Office Action U.S. Appl. No. 14/014,668, 12 pages.
Dec. 8, 2015 Office Action (3 months) 1 U.S. Appl. No. 14/282,426, 18 pages.
Feb. 23, 2016 Office Action (3 months) 2 U.S. Appl. No. 14/014,668, 15 pages.
Mar. 7, 2016 Final Office Action U.S. Appl. No. 14/243,350, 17 pages.
Mar. 23, 2016 Chinese First Office Action CN Application No. 201310024382.7, 18 Pages.
Apr. 8, 2016 European Union Office Action (2 months) EM Application No. 3041961, 2 Pages.
Apr. 12, 2016 Second Office Action DE App. No. 10207257.4, 12 pages.
May 17, 2016 Advisory Action U.S. Appl. No. 14/243,350, 3 pages.
May 26, 2016 Notice of Allowance CN Application No. 201630064772.1, 4 Pages.
May 27, 2016 Notice of Allowance CN App. No. CN2016300589092, 4 pages.
Jun. 16, 2016 Office action (3 months) U.S. Appl. No. 14/513,590, 10 pages.
Jul. 7, 2016 Notice of Allowance U.S. Appl. No. 14/282,426, 7 Pages.
Jul. 13, 2016 First Office Action IL58345, 2 pages.
Jul. 29, 2016 Office action (3 months) 2 U.S. Appl. No. 14/243,350, 13 pages.
Aug. 2, 2016 Japan Notice of Allowance JP Application No. 2016005516, 4 Pages.
Aug. 22, 2016 Israel First Office Action IL Application No. 58345, 5 Pages.
Sep. 27, 2016 Japan First Office Action JP Application No. 2013-006979, 6 Pages.
Oct. 20, 2016 Non-Final Office Action (3 months) 1 U.S. Appl. No. 29/541,762, 15 Pages.
Oct. 25, 2016 Non-Final Office Action (3 months) 1 U.S. Appl. No. 29/541,767, 16 Pages.
Nov. 15, 2016 EPO Notification R161(1) & R. 162, EP Application No. 15717103.4, 4 Pages.
Nov. 16, 2016 Second Office Action CN Application No. 201310024382.7, 10 Pages.
Nov. 23, 2016 Final Office Action 2 U.S. Appl. No. 14/243,350, 14 Pages.
Dec. 30, 2016 Final Office Action U.S. Appl. No. 14/513,590, 9 pages.
Feb. 10, 2017 Advisory Action (PTOL-303) 2 U.S. Appl. No. 14/243,350, 03 Pages.
Feb. 13, 2017 Notice of Allowance U.S. Appl. No. 29/541,762, 7 Pages.
Feb. 14, 2017 Notice of Allowance U.S. Appl. No. 29/541,767, 11 Pages.
Feb. 24, 2017 Advisory Action (PTOL-303) U.S. Appl. No. 14/513,590 2 pages.
Mar. 10, 2017 Office action (3 months) U.S. Appl. No. 14/877,604, 34 pages.
Mar. 17, 2017 Notice of Allowance CN Application No. 201310024382.7, 05 Pages.
Mar. 21, 2017 Non-Final Office Action (3 months) 1 U.S. Appl. No. 14/877,685, 31 Pages.
Mar. 22, 2017 First office action German App. No. DE102013220884.7, 6 pages.
Mar. 22, 2017 Non-Final Office action (3 months) U.S. Appl. No. 14/669,298, 18 pages.
Apr. 1, 2017 First Office Action CN Application No. 201410207255.5, 20 Pages.
Apr. 6, 2017 First Office Action DE Application No. 102014206796.0, 11 Pages.
Apr. 6, 2017 Israel Second Office Action IL Application No. 231436, 10 Pages.
Apr. 19, 2017 First Office Action CN Application No. 201410129013.9, 18 Pages.
May. 9, 2017 Japan Second Office Action JP Application No. 2013-006979, 8 Pages.
May 23, 2017 Notice of Allowance U.S. Appl. No. 29/541,767, 32 Pages.
May 25, 2017 Notice of Allowance U.S. Appl. No. 29/541,762, 32 Pages.
May 25, 2017 Office Action (3 months) 3 U.S. Appl. No. 14/243,350, 14 Pages.
Jun. 27, 2017 Office action (3 months) U.S. Appl. No. 14/513,590, 32 pages.
Jul. 14, 2017 Office Action (3 months) 1 U.S. Appl. No. 15/190,284, 36 Pages.
Aug. 22, 2017 Japan Notice of Allowance JP Application No. 2013-006979, 6 Pages.
Aug. 22, 2017 Notice of Allowance CN Application No. 201310677120.0, 5 Pages.
Sep. 6, 2017 Final Office Action U.S. Appl. No. 14/877,604, 15 pages.
Sep. 19, 2017 Final Office Action U.S. Appl. No. 14/877,685, 73 Pages.
Nov. 17, 2017 German First Office Action DE Application No. 102017205166.3, 9 Pages.
Nov. 22, 2017 First Office Action DE Application No. 102015211744.8, 11 Pages.
Dec. 1, 2017 Second Office Action CN Application No. 201410129013.9, 11 Pages.
Dec. 13, 2017 Notice of Allowance U.S. Appl. No. 14/877,604, 39 Pages.
Dec. 18, 2017 Second Office Action CN Application No. 201410207255.5, 22 Pages.
Dec. 29, 2017 Office action (3 months) 1 U.S. Appl. No. 15/302,443, 84 pages.
Jan. 11, 2018 Chinese First Office Action CN Application No. 201580018557.0, 16 Pages.
Mar. 6, 2018 Japan First Office Action JP Application No. 2014075465, 9 Pages.
Mar. 19, 2018 Notice of Allowance U.S. Appl. No. 14/877,604, 40 Pages.
Apr. 12, 2018 Notice of Allowance U.S. Appl. No. 15/190,284, 60 Pages.

(56) References Cited

OTHER PUBLICATIONS

May. 29, 2018 Notice of Allowance CN Application No. 201410129013.9, 4 Pages.
Jun. 5, 2018 Chinese Office Action CN Application No. 201410207255.5, 10 Pages.
Jun. 6, 2018 German Office Action DE Application No. 102013209371.3, 4 Pages.
Jun. 27, 2018 Notice of Allowance IL Application No. 231436, 8 Pages.
Jul. 24, 2018 Foreign Office Action for German Application No. 102017212054.1, 5 Pages.
Jul. 24, 2018 Office Action German Application No. 102012200690, 4 pages.
Aug. 28, 2018 Japan Office Action JP Application No. 2014075465, 3 Page.
Sep. 13, 2018 Chinese Office Action CN Application No. 201580018557.0, 8 Pages.
Nov. 7, 2018 Notice of Allowance DE Application No. DE102017212054.1, 12 Pages.
Nov. 19, 2018 Office Action CN Application No. CN201580018557.0, 8 Pages.
Jan. 10, 2019 Notice of Allowance CN Application No. 201410207255.5, 5 Pages.
Feb. 19, 2019 Notice of Allowance CN Application No. 201580018557.0, 5 Pages.
Mar. 5, 2019 Japan Notice of Allowance JP Application No. 2014075465, 2 Pages.
Mar. 8, 2019 Non-Final Office Action U.S. Appl. No. 15/937,262, 50 Pages.
Mar. 11, 2019 Foreign Office Action CN Application No. 201610851376.2, 14 Pages.
May 5, 2019 Chinese Office Action (Non-US) CN Application No. 201610245208.9 (CN106064245A), 26 Pages.
Jun. 13, 2019 Non-Final Office Action for U.S. Appl. No. 15/681,811, 18 Pages.
Jan. 29, 2020 Notice of Allowance U.S. Appl. No. 15/681,811, 75 Pages.
Feb. 3, 2020 Exam Notice CN Application No. 201810208355.8, 2 Pages.
May 27, 2020 Chinese Office Action (Non-US) CN Application No. 201810208355.8 (CN108655428A), 10 Pages.
Jun. 16, 2020 Notice of Allowance U.S. Appl. No. 15/681,811, 16 Pages.
Oct. 7, 2020 Non-Final Office Action U.S. Appl. No. 16/034,891, 54 pages.
Dec. 14, 2020 German Office Action (Non-US) DE Application No. 102017205166.3 (DE102017205166A1), 9 Pages.
Jan. 6, 2021 Final Office Action U.S. Appl. No. 16/034,891, 14 pages.
Feb. 2, 2021 Chinese Office Action (Non-US) CN Application No. 201810208355.8 (CN108655428A), 9 Pages.
Mar. 1, 2021 Chinese Office Action (Non-US) CN Application No. 201810762240.3 (CN109249188A), 8 Pages.
Mar. 15, 2021 Advisory Action (PTOL-303) U.S. Appl. No. 16/034,891 3 pages.
May 20, 2021 Office Action (non-US) CN Application No. CN201810208355 (108655428A), 7 Pages.
Jul. 23, 2021 EPO Notification R.70b(1) European Application No. 20189283.3 (3778083), 1 page.
Aug. 26, 2021 Non-Final Office Action U.S. Appl. No. 16/034,891, 16 pages.
Oct. 22, 2021 Chinese Office Action CN Application No. 201810762240.3, 11 Pages.
Feb. 18, 2022 Non-Final OA U.S. Appl. No. 16/992,833, Feb. 18, 2022-Non Final.pdf, 33 Pages.
Mar. 16, 2022 Final Office Action U.S. Appl. No. 16/034,891, 7 pages.
Mar. 22, 2022 Office action (3 months) (US Only) U.S. Appl. No. 16/898,811 (2020-0391297), 35 pages.
May 7, 2022 Office Action (non-US) CN App. No. 109249188A.
Jun. 9, 2022 Final Office Action U.S. Appl. No. 16/034,891, 10 pages.
Jun. 20, 2022 Final Office Action (US Only) US App. No. 20210046555A1.
Sep. 28, 2022 Notice of Allowance U.S. Appl. No. 16/034,891, 9 pages.
Oct. 3, 2022 Final Rejection U.S. Appl. No. 16/898,811 (Pub No. US20200391297), 8 pages.
Nov. 7, 2022 Foreign Office Action Chinese Application No. 201810762240.3, 14 pages.
Dec. 22, 2022 Foreign Office Action Chinese Application No. 201610851376.2, 23 Pages.
Jan. 6, 2023 Non-Final Office Action U.S. Appl. No. 16/992,833, 13 pages.
Jan. 10, 2023 Notice of Allowance U.S. Appl. No. 16/898,811 (Pub No. US20200391297), 7 pages.
Jan. 17, 2023 Foreign Office Action Japanese Application No. 20200509460, 2 Pages.
Jan. 20, 2023 Foreign Office Action Chinese Application No. CN201811588752.9, 18 Pages.
Mar. 14, 2023 Non-Final Office Action U.S. Appl. No. 16/898,641, 10 Pages.
Mar. 17, 2023 Foreign Office Action Chinese Application No. CN201610851376.2, 30 Pages.
Mar. 27, 2023 Notice of Allowance for U.S. Appl. No. 16/992,833, 5 Pages.
Apr. 22, 2023 Foreign Office Action Chinese Application No. CN201810762240.3, 12 Pages.
Apr. 24, 2023 Notice of Allowance for U.S. Appl. No. 16/898,811, 4 Pages.
May 10, 2023 Foreign Office Action Indian Application No. IN201941023533, 6 Pages.
Jun. 14, 2023 Foreign Office Action Chinese Application No. CN201810208355.8, 19 Pages.
Aug. 29, 2023 Foreign Office Action Chinese Application No. CN201810208355.8, 20 Pages.
Brochure "Ken-Tip Drill," Kennametal Inc., Latrobe, PA, pp. H112-H115.
Catalogue 2071: "Holemaking New Products," Kennametal Inc., Latrobe, PA2002, 54 pages.
European Search Report for European Application No. 03003151.2, mailed Sep. 29, 2004, 7 Pages.
European Search Report for European Application No. 96109374.7, mailed Oct. 2, 1996, 6 Pages.
Extended European Search Report for European Application No. 09004978.4, mailed Jun. 16, 2009, 5 Pages.
Extended European Search Report for European Application No. 12002361.9, mailed Jul. 9, 2012, 7 Pages.
Extended European Search Report for European Application No. 17922879.6, mailed Apr. 23, 2021, 8 Pages.
Extended European Search Report for European Application No. 20189283.3, mailed Jan. 19, 2021, 9 Pages.
Gaspar Erich Stemmer: "Ferramentas De Corte II," 1995, 5 Pages.
International Preliminary Report on Patentability for corresponding Application No. PCT/US2004/040829, mailed May 8, 2006, 6 pages.
International Preliminary Report on Patentability for International Application No. PCT/2017/055139, mailed Mar. 5, 2020, 14 Pages.
International Preliminary Report on Patentability for International Application No. PCT/EP2004/005974, mailed Sep. 26, 2005, 12 Pages.
International Preliminary Report on Patentability for International Application No. PCT/EP2015/056288, mailed Oct. 20, 2016, 9 Pages.
International Search Report and Written Opinion of the International Searching Authority, or the Declaration, in corresponding Application PCT/US2004/040829, mailed Jun. 1, 2005, 9 pages.
International Search Report for International Application No. PCT/EP2003/001526, mailed Jun. 18, 2003, 6 pages.
International Search Report for International Application No. PCT/US2002/030136, mailed Dec. 19, 2002, 1 page.
International Search Report with Written Opinion for International Application No. PCT/2017/055139, mailed Apr. 27, 2018, 16 pages.

(56) References Cited

OTHER PUBLICATIONS

International Search Report with Written Opinion for International Application No. PCT/EP2004/005974, mailed Dec. 3, 2004, 9 pages.
Ogawa M., et al., "Micro Drilling of 5056 Wrought Aluminum Alloy," Keikinzoku/Journal of Japan Institute of Light Metals, Sep. 1994, vol. 44, No. 9, pp. 486-491.
Partial European Search Report for European Application No. 03003151.2, mailed Jul. 7, 2003, 5 Pages.
"Practical Tool Technology for Metal Cutting," Taiyuan Metal Cutting Tools Association, Oct. 31, 1993, pp. 152-153, Machinery Industry Press.
Rocek V., "Cutting Tools for Special Machine Construction and Automatic Production Cycle Lines," German Publication, Technical Publisher Gnter Grossmann GmbH, Stuttgart-Vaihingen, 1972, pp. 78-79.
Supplementary European Search Report for European Application No. 02761793.5, mailed Apr. 9, 2008, 3 Pages.
Supplementary European Search Report for European Application No. 04813182.5, mailed Jul. 1, 2008, 4 Pages.
Dec. 13, 2023 Foreign Office Action Chinese Application No. CN202010484243, 21 Pages.
Dec. 14, 2023 Foreign Office Action Chinese Application No. CN202010484269, 22 Pages.
Jan. 4, 2024 Foreign Office Action Chinese Application No. CN201810208355, 28 Pages.
Jun. 7, 2024 Foreign Office Action Chinese Application No. CN202010484269.7, 5 pages.
Jun. 25, 2024 Foreign Office Action Chinese Application No. CN202210790681, 02 pages.
Jul. 1, 2024 Foreign Office Action Chinese Application No. CN201811588752.9, 20 pages.
Sep. 21, 2023 Final Office Action U.S. Appl. No. 16/898,641, 12 Pages.
Mar. 18, 2024 Foreign Office Action Chinese Application No. CN201810208355.8, 8 Pages.
Dec. 18, 2023 Foreign Office Action Chinese Application No. CN202010709204.8, 25 Pages.
Foreign Office Action Chinese Application No. CN202010484243.2, 15 Pages.
Foreign Office Action Chinese Application No. CN202010709204.8, 08 Pages.
Sep. 21, 2023 Foreign Office Action Indian Application No. IN201941023475, 6 Pages.
Oct. 20, 2023 Notice of Allowance for U.S. Appl. No. 16/898,641, 5 Pages.
Oct. 23, 2023 Foreign Office Action German Application No. DE102022119393, 6 Pages.
Nov. 3, 2023 Notice of Allowance for U.S. Appl. No. 16/898,641, 2 Pages.
Sep. 2, 2024 Foreign Office Action Chinese Application No. CN202010484269, 07 Pages.
Sep. 13, 2024 Foreign Office Action Chinese Application No. CN202010709204, 07 Pages.

* cited by examiner

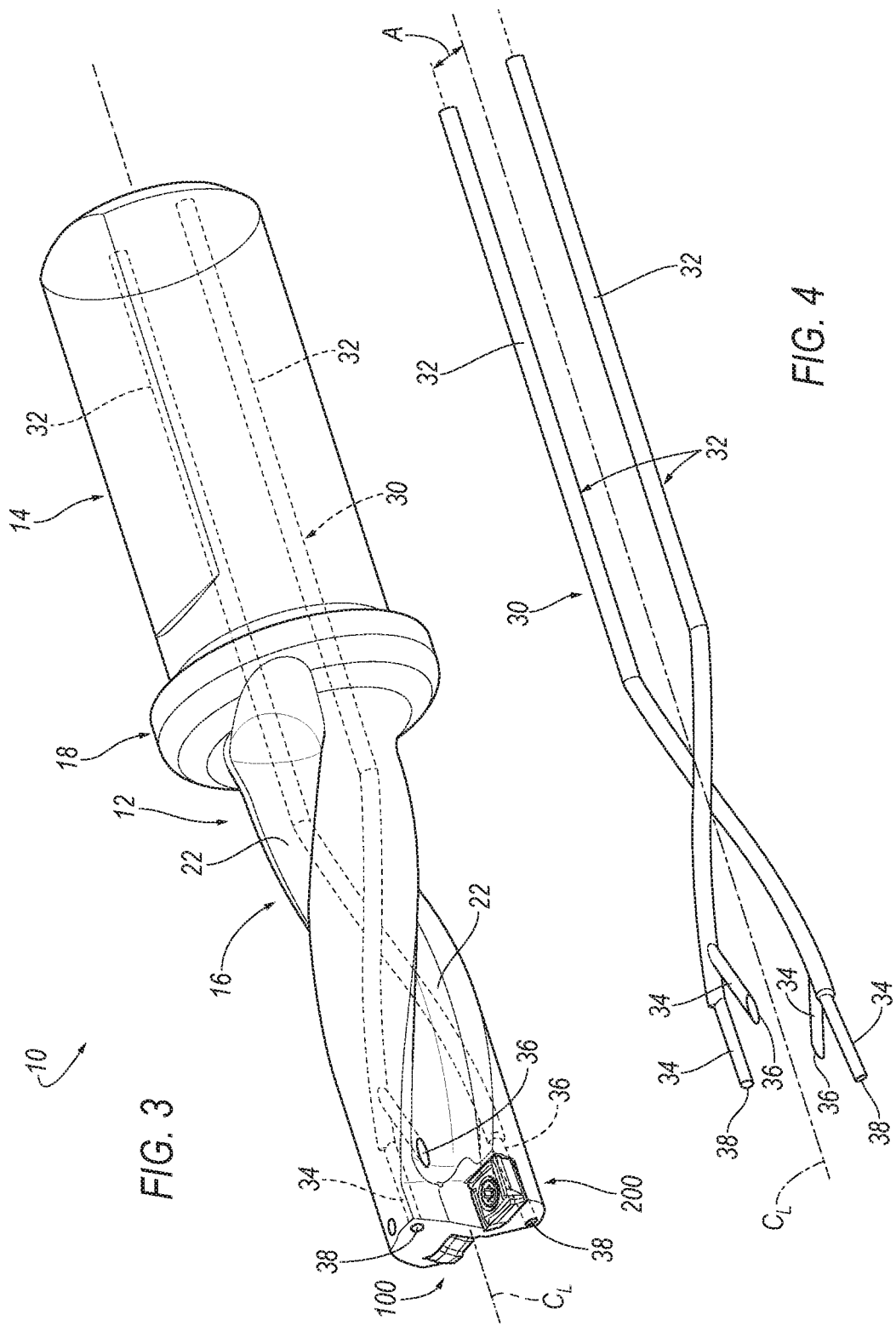

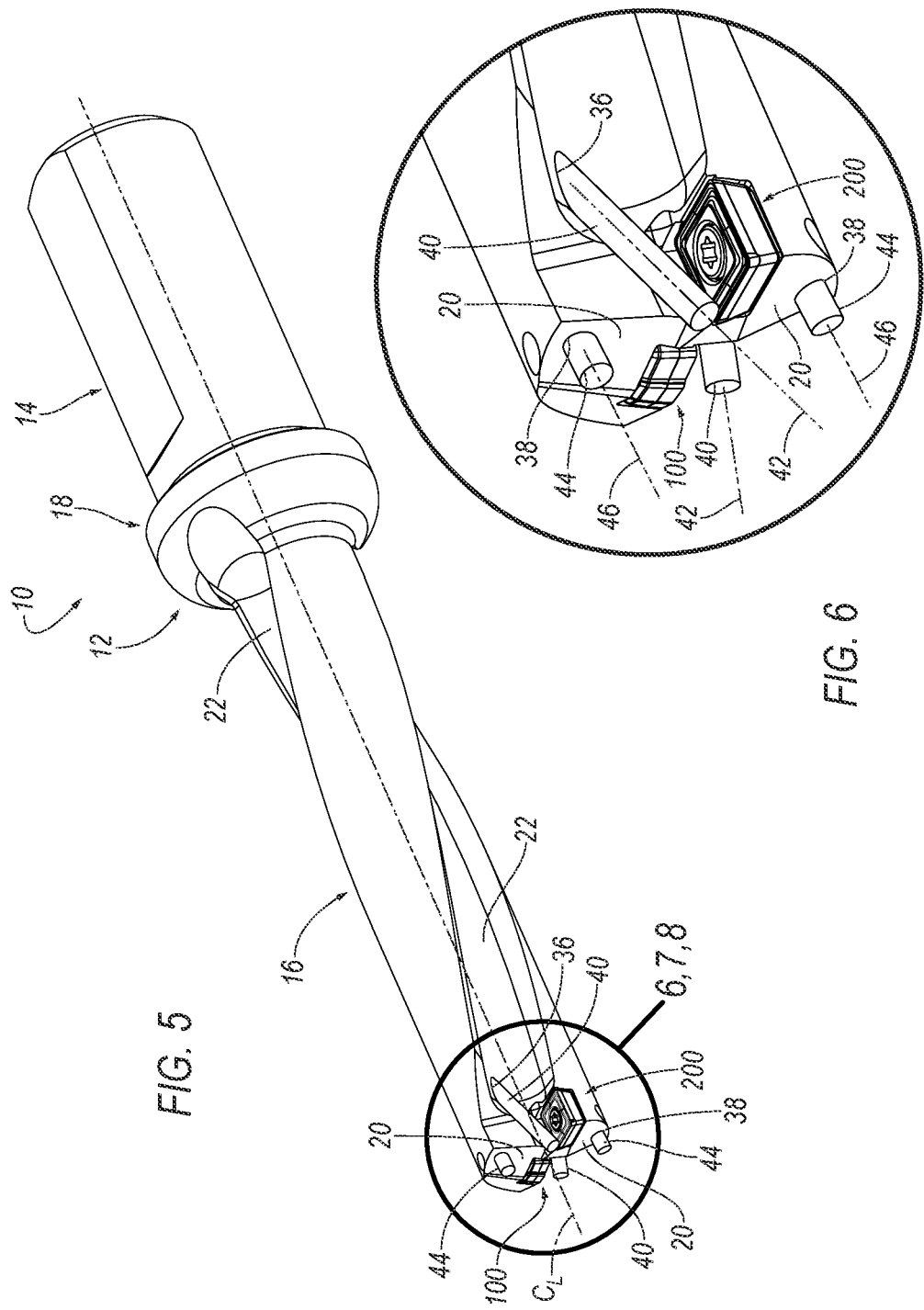

INDEXABLE DRILL ASSEMBLY WITH COOLANT SYSTEM

RELATED APPLICATION DATA

The present application claims priority pursuant to 35 U.S.C. § 119(a) to Indian Patent Application Number 202141037157, filed Aug. 17, 2021 which is incorporated herein by reference in its entirety.

FIELD

The invention relates to a drill assembly, and in particular, to an indexable drill assembly with primary coolant channels and flute coolant exit apertures, wherein a projection of a flute coolant exit aperture intersects an area defined as a function of the cutting length and the diameter of the inscribed circle (IC) for a central cutting insert and/or a peripheral cutting insert.

BACKGROUND

Drilling tools can be used to drill cylindrical holes in metallic workpieces. The cutting or boring action of the drill tools may be carried out by an elongated, substantially cylindrical drilling tool, such as a combination of a tool holder and a drill insert, which is selectively attached thereto. Such an arrangement may then be used in an application wherein one end of the tool holder is securely mounted in a driving apparatus, which rotates the holder about its longitudinal axis. At the opposite end of the elongated tool holder, the cutting insert engages the material to be cut. Alternatively, the workpiece may be made to rotate relative to the holder and cutting insert, such as in positioning the holder in the tail stock of a lathe or the like. Further, tool and workpiece can be made to rotate relative to one another. The use of cutting inserts allows for quick changing of the insert upon wear of the cutting surfaces instead of the entire tool and allows for one tool to be used for a variety of different boring applications by simply changing the insert and not the entire drill assembly.

The indexable drill inserts plays a very important role in drilling because all the sides of insert can be used for cutting one after the other. Further, use of inserts reduces the manufacturing lead time, assembling time and cost per component. However, it has been observed that excessive wear and temperatures may be generated in the vicinity of the web region due to chip rubbing, thereby reducing the lifetime of the indexable drill. One of many solutions is to provide a laser hardened side clearance face in the vicinity of the web region. However, this solution increases the manufacturing cost of the indexable drill. In addition, this solution does not effectively dissipate heat from web region of the indexable drill.

In view of the foregoing, it is desirable to reduce temperature and wear in the vicinity of the web region without significantly increasing the cost of the indexable drill.

SUMMARY

The problem of reducing temperature and wear in the vicinity of the web region of an indexable drill is solved by providing a projection of a flute coolant exit aperture that intersects areas defined as a function of the cutting length and the diameter of the inscribed circle (IC) for the central cutting insert and can intersect areas defined as a function of the cutting length and the diameter of the inscribed circle (IC) for the peripheral cutting insert.

In one aspect, an indexable drill assembly comprises a drill body having a central longitudinal rotational axis. The drill body comprises a shank portion and a fluted cutting portion. The fluted cutting portion has a front clearance face and a plurality of flutes. The fluted cutting portion includes a central insert pocket proximate the front clearance face and capable of receiving a central cutting insert. The fluted cutting portion also includes a peripheral insert pocket proximate the front clearance face and capable of receiving a peripheral cutting insert. The indexable drill assembly further comprises a coolant system comprising a plurality of primary coolant channels extending entirely through the shank portion and at least partially into the fluted cutting portion of the drill body, and one or more secondary flute coolant channels extending from one of the plurality of primary coolant channels and terminating at a flute coolant exit aperture formed in one of the plurality of flutes.

For the central cutting insert, the flute coolant exit aperture produces a projection of coolant having a central, longitudinal axis that intersects a vertical plane, PA1, having an area, A1, defined by the following equation:

$$A1 = (CL1 * 0.85) * \left(\left(\frac{CL1}{\sqrt{2}}\right) * 1.2 \text{ mm}\right)$$

where,
CL1 is a cutting length of the central cutting insert in a lateral direction.

In another aspect, for the central cutting insert, the flute coolant exit aperture produces a projection of coolant having a central, longitudinal axis that intersects a horizontal plane, PB1, having an area, A2, defined by the following equation:

$$A2 = (CL1 * 0.85) * \left(\frac{IC1}{2}\right)$$

where,
CL1 is a cutting length of the central cutting insert in a lateral direction, and
IC1 is a diameter of an inscribed circle, IC, of the central cutting insert in a lateral direction.

In yet another aspect, for the peripheral cutting insert, the flute coolant exit aperture produces a projection of coolant having a central, longitudinal axis that intersects a vertical plane, PA2, having an area, A3, defined by the following equation:

$$A3 = (CL2 * 0.85) * ((CL2 * 0.6) * 0.5 \text{ mm}))$$

where,
CL2 is a cutting length of the peripheral cutting insert in a lateral direction.

In still yet another aspect, for the peripheral cutting insert, the flute coolant exit aperture produces a projection of coolant having a central, longitudinal axis that intersects a horizontal plane, PB2, having an area, A4, defined by the following equation:

$$A4 = (CL2 * 0.85) * \left(\frac{IC2}{2}\right)$$

where,
    CL2 is a cutting length of the peripheral cutting insert in a lateral direction, and
    IC2 is a diameter of an inscribed circle, IC, of the peripheral cutting insert.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 3 is a perspective view of the drill assembly of FIG. 1 with a coolant system (shown in phantom);

FIG. 4 is a schematic diagram of the coolant system of the drill assembly of FIG. 1;

FIG. 5 is another perspective view of the drill assembly of FIG. 1;

FIG. 6 is an enlarged view of the drill assembly showing the projections of the flute coolant exit apertures and the projections of the front clearance face coolant exit apertures according to an embodiment of the invention;

DETAILED DESCRIPTION

Figure 1:
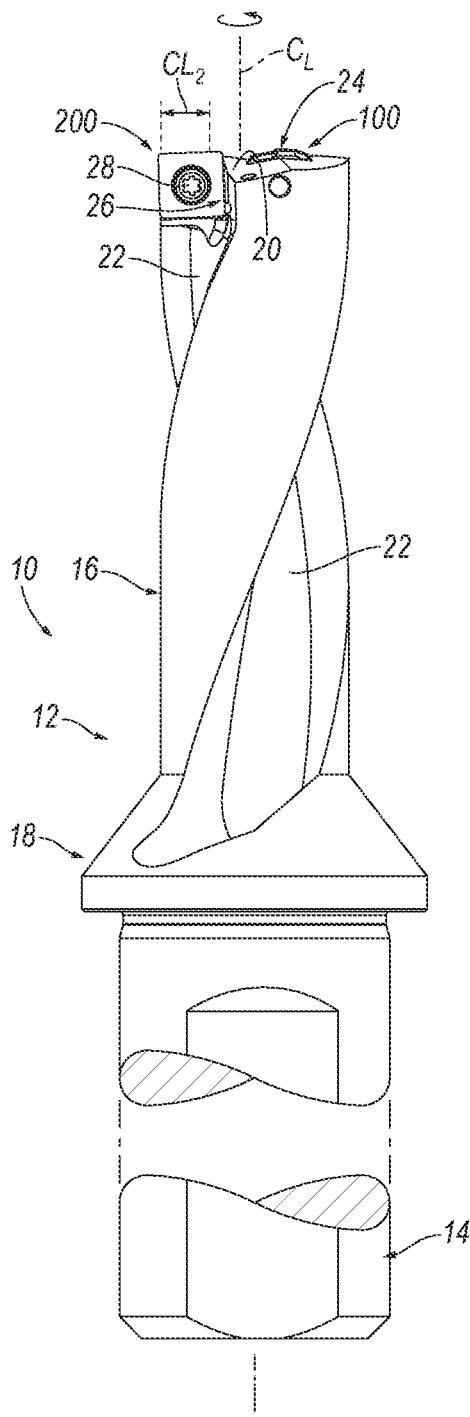
FIG. 1 is a side view of a drill assembly comprising a drill body with a central cutting insert mounted in a central pocket of the drill body and a peripheral cutting insert mounted in a peripheral pocket of the drill body according to an embodiment of the invention.

Below are illustrations and explanations for a version of a cutting tool, such as an orbital drill, and the like, with both right-handed helical or spiral flutes and left-handed helical or spiral flutes for machining a workpiece (not shown) made of multiple materials. However, it is noted that the cutting tool may be configured to suit any specific application, such as reaming, end milling, and the like, and is not limited only to the example in the illustrations.

The description herein of specific applications should not be a limitation on the scope and extent of the use of the cutting tool.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc., are to be understood as modified in all instances by the term "about".

Accordingly, unless indicated to the contrary, the numerical parameters set forth in this specification and attached claims are approximations that can vary depending upon the desired results sought to be obtained by the invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As defined herein, the term "vertical" is defined as being substantially perpendicular to a central, longitudinal axis, $C_L$, of the cutting tool.

As defined herein, the term "horizontal" is defined as being substantially parallel to the central, longitudinal axis, $C_L$, of the cutting tool.

Figure 2:
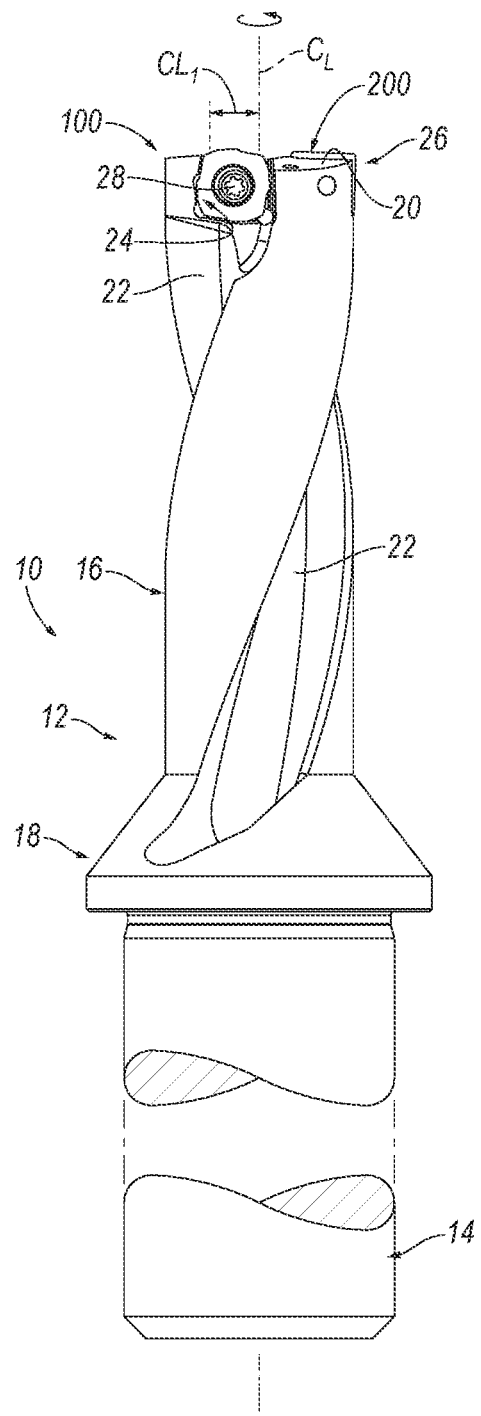
FIG. 2 is another side view of a drill assembly of FIG. 1.

Referring now to FIGS. 1 and 2, a rotary cutting tool 10, such as an indexable drill assembly, and the like, is shown according to an embodiment of the invention. The indexable drill assembly 10 includes a drill body 12 having a generally cylindrical shank portion 14 at one end, a fluted cutting portion 16 at an opposite end. A flange portion 18 may be disposed between the cylindrical shank portion 14 and the fluted cutting portion 16. The drill body 12 rotates in the direction of the arrow about a central, longitudinal axis, $C_L$.

The fluted cutting portion 16 includes a front clearance face 20 and a plurality of flutes 22. In the illustrated embodiment, the fluted cutting portion 16 includes two flutes 22, but any other suitable number of flutes may be used. For example, there may be one, three, four, five or more flutes. In addition, the flutes 22 may be helical (or twisted) or straight. The fluted cutting portion 16 includes a central insert pocket 24 proximate the front clearance face 20. The central insert pocket 24 is structured and arranged to receive a central cutting insert 100 having a cutting length, CL1, in a lateral direction. Similarly, the fluted cutting portion also includes a peripheral insert pocket 26 structured and arranged to receive a peripheral cutting insert 200 having a cutting length, CL2. An insert screw 28 can be used to mount the central cutting insert 100 and the peripheral cutting insert 200 in the central insert pocket 24 and the peripheral insert pocket 26, respectively.

The drill body 12 may be made of any suitable material, such as steel, stainless steel or any other material having sufficient strength. The drill body 12 may be fabricated by any suitable technique, such as machining to provide the insert pockets and flutes.

As shown in FIGS. 1 and 2, the width and location of the central cutting insert 100 and the peripheral cutting insert 200 are selected to allow the operational cutting ranges of the cutting inserts to overlap during rotation of the drill body 12. In one embodiment, the orientation and length of the plurality of cutting edges are selected to provide substantially equal cutting to be performed by the central cutting insert 100 and the peripheral cutting insert 200. In another embodiment, the peripheral insert pocket 26 and the peripheral cutting insert 200 are structured and arranged to allow the central cutting insert 100 to make first contact with a workpiece (not shown).

The central and peripheral cutting inserts 100, 200 may be made of any suitable material, such as tool steels, cemented carbides, and superhard material, such as cubic boron nitride (CBN), polycrystalline cubic boron nitride (PCBN), polycrystalline diamonds (PCD), tungsten carbide (WC), cermet, ceramic, and the like. The central and peripheral cutting inserts 100, 200 of the present invention may be fabricated by any suitable technique, such as carbide powder pressing, grinding or additive manufacturing to provide a plurality of cutting edges (not shown) as is known in the art.

Referring now to FIGS. 3 and 4, the drill assembly 10 includes a coolant system 30 comprising a plurality of primary coolant channels 32 extending entirely through the shank portion 14 and at least partially into the fluted cutting portion 16 of the drill body 12. In one embodiment, the total number of primary coolant channels 32 correspond to the total number of flutes 22. For example, in the illustrated embodiment, the drill assembly 10 has a total of two flutes 22 and a total of two primary coolant channels 32. The primary coolant channels 32 may be formed substantially parallel with respect to the central, longitudinal axis, $C_L$. In other words, the primary coolant channels 32 are formed at an angle, A, equal to zero degrees with to the central, longitudinal axis, $C_L$. In another embodiment, the primary coolant channels 32 may be formed at an angle, A, not equal to zero degrees with respect to the longitudinal axis, $C_L$. It may be noted that the primary coolant channels 32 are helically formed in the fluted cutting portion 16 because the drill assembly 10 has helical flutes 22. It should also be noted that the helix angle of the primary coolant channels 32 may be substantially equal to or slightly different than the helix angle of the flutes 22. However, it will be appreciated that the primary coolant channels 32 may be substantially straight or slightly skewed or angled in the case where the drill assembly 10 has straight flutes, rather than helical flutes.

The coolant system 30 also comprises one or more secondary coolant channels 34 that branch from one of the primary coolant channels 32. In the illustrated embodiment, each primary coolant channel 32 branches into two secondary coolant channels 34; one secondary coolant channel 34 terminating at a flute coolant exit aperture 36 formed in the flute 22, and the other secondary coolant channel 34 terminating at a front clearance face coolant exit aperture 38 formed in the front clearance face 20. Thus, in the illustrated embodiment in which the drill assembly 10 has a total of two flutes 22, the drill assembly 10 has a total of four coolant exit apertures 36, 38 (i.e., two flute coolant exit apertures 36 and two front clearance face coolant exit apertures 38). It will be appreciated that the invention is not limited by the number of coolant exit apertures, and that the invention can be practiced with any desirable number of coolant exit apertures 36, 38, depending on the number of flutes 22.

Referring now to FIGS. 5 and 6, the flute coolant exit aperture 36 produces a projection 40 of coolant having a central, longitudinal axis 42. Similarly, the front clearance face coolant exit aperture 38 produces a projection 44 of coolant having a central, longitudinal axis 46. It should be appreciated that the invention is not limited by the geometric shape of the exit apertures 36, 38 and corresponding projections 40, 42, and that the invention can be practiced with exit apertures 36, 38 having any desired geometric shape, such as circular, oval, triangular, rectangular, and the like.

Figure 7:
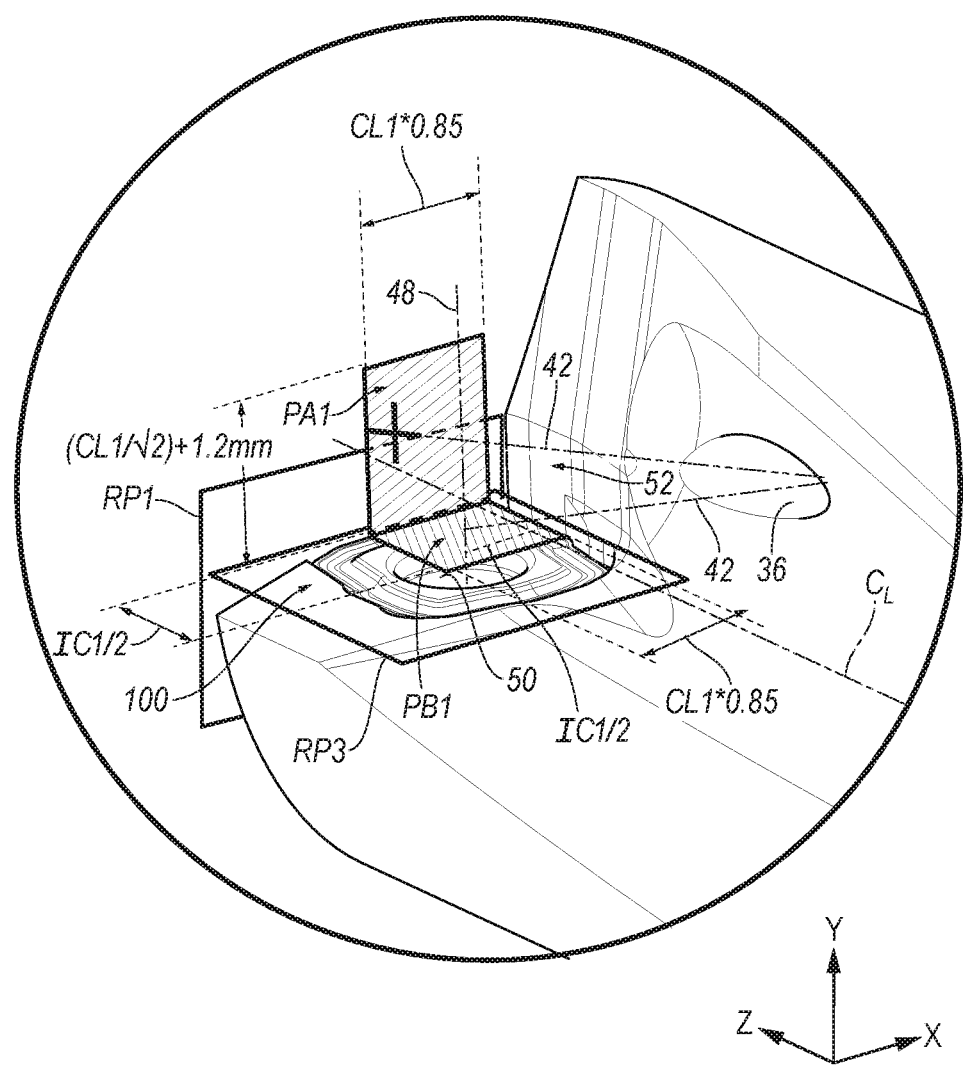
FIG. 7 is an enlarged rear perspective view of the drill assembly showing the central, longitudinal axis of the projection for central cutting insert intersecting a vertical plane or a horizontal plane having an area defined by the cutting length in a lateral direction for a central cutting insert according to an embodiment of the invention.
Figure 8:
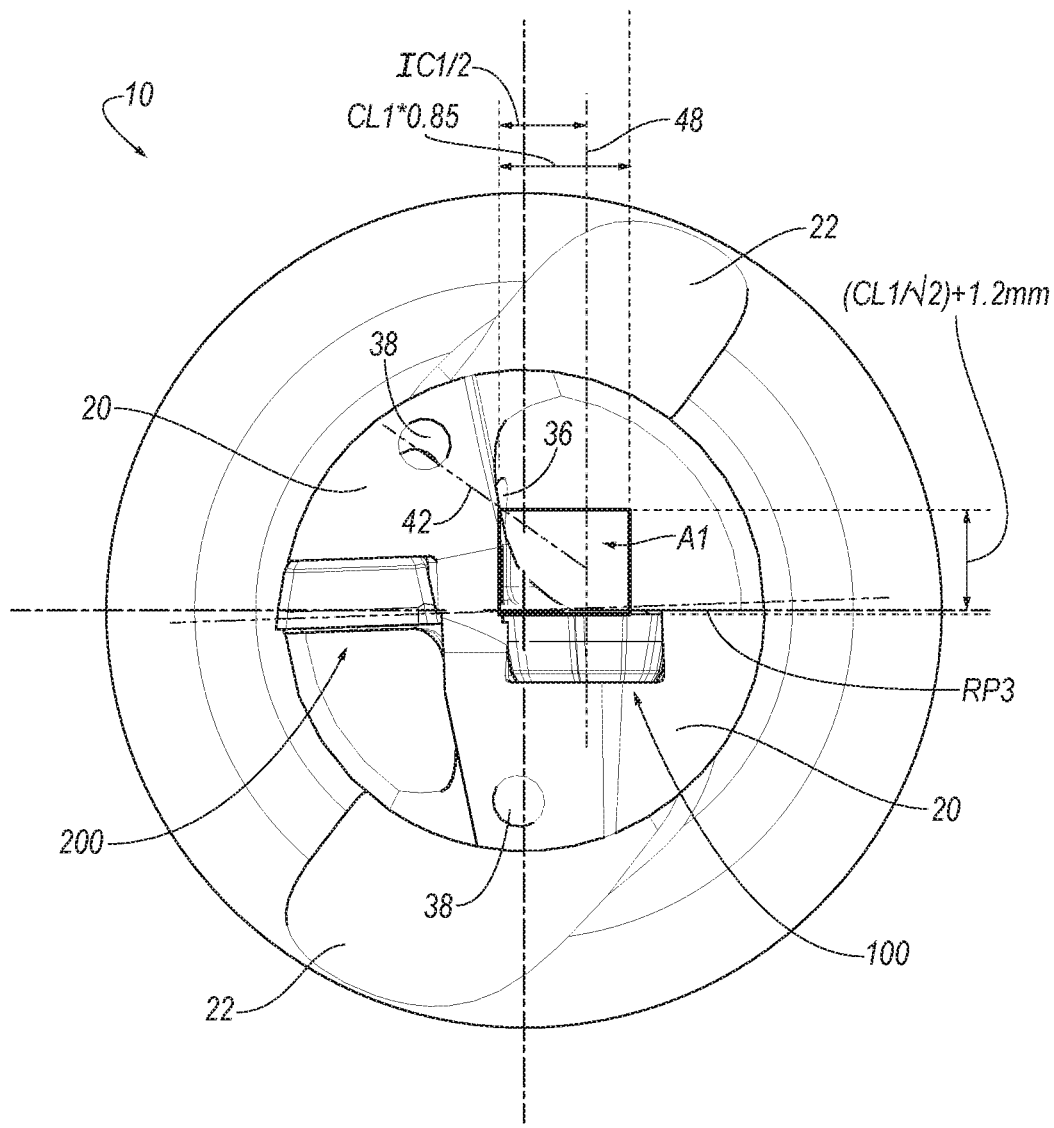
FIG. 8 is an enlarged front view of drill assembly showing the area and position of the vertical plane that is intersected by the projection of the flute coolant exit aperture for the central cutting insert according to an embodiment of the invention.
Figure 9:
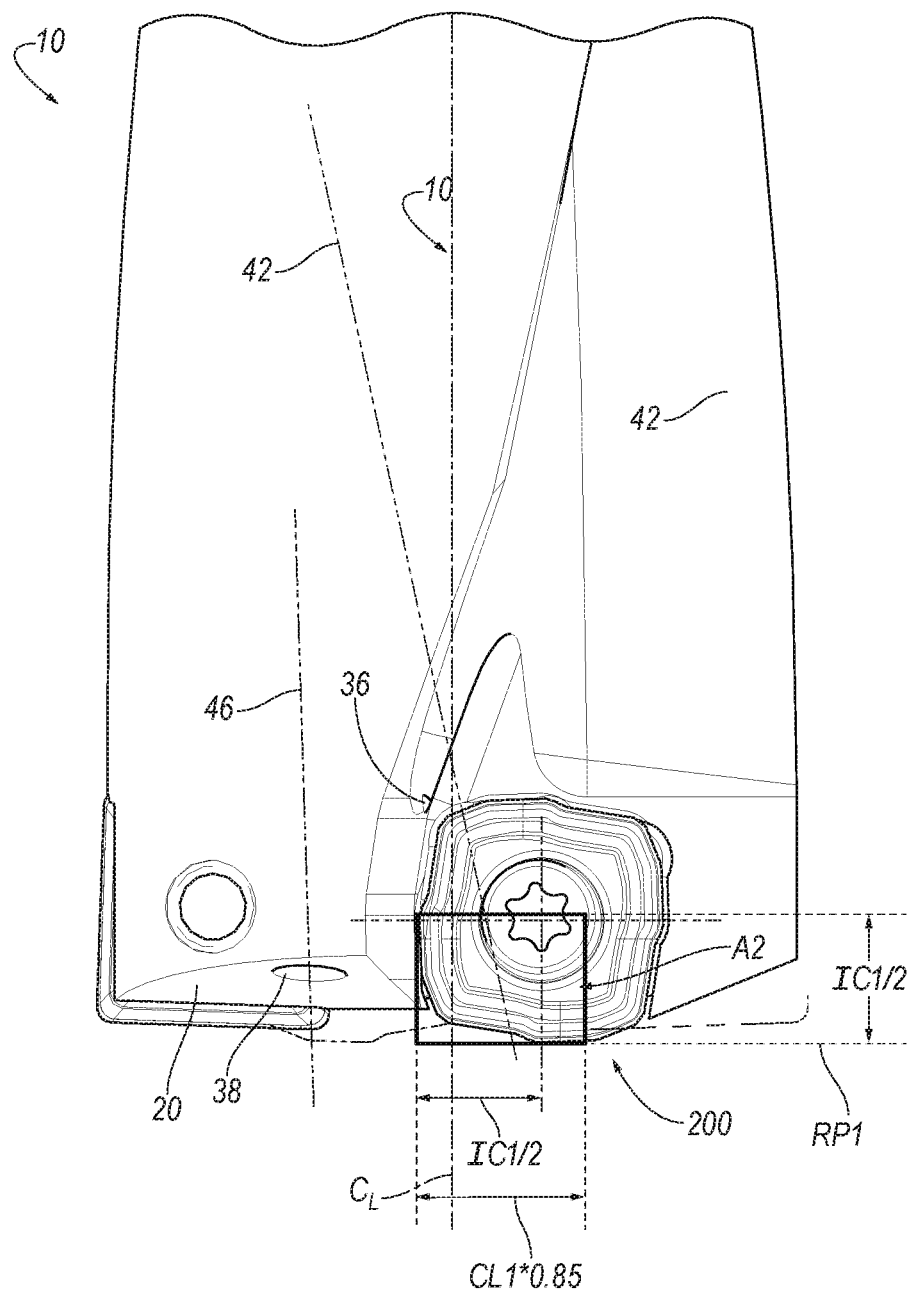
FIG. 9 is an enlarged top view of drill assembly showing the area and position of a horizontal plane that is intersected by the projection of the flute coolant exit aperture for the central cutting insert according to an embodiment of the invention.

As shown in FIGS. 7-9, one aspect of the invention is that a central, longitudinal axis 42 of a projection 40 of the flute coolant exit aperture 36 for the central cutting insert 100 can be designed to intersect a vertical plane, PA1, having a first area, A1, defined by a base (i.e., x-dimension) times a height (i.e., y-dimension). In other words: A1=base*height. For the central cutting insert 100, the first area, A1, can be defined by the following equation:

$$A1 = (CL1 * 0.85) * ((CL1/\sqrt{2}) + 1.2 \text{ mm}) \qquad \text{(Eq. 1)}$$

where,

CL1 is a cutting length (mm) of the central cutting insert 100 in a lateral direction (see FIGS. 1 and 2).

As seen in FIGS. 7 and 8, the vertical plane, PA1, is collinear with a first reference plane, RP1, that lies on the first cutting point for the active cutting edge of the central cutting insert 100 and is substantially perpendicular to the central, longitudinal rotational axis, $C_L$. As is known in the art, the first cutting point is the location at which the active cutting edge first engages the workpiece. In addition, the vertical plane, PA1, extends radially outward from a thin web region 52 of the indexable drill assembly 10. The base or x-dimension (i.e., CL1*0.85) of the vertical plane, PA1, lies on or above a third reference plane, RP3, and has a height or y-dimension equal to (CL1/square root 2)+1.2 mm. The third reference plane, RP3, lies on the active cutting edge of the central cutting insert 100 and is substantially parallel to the central, longitudinal rotational axis, $C_L$.

In one embodiment, the base or x-dimension of the vertical plane, PA1, lies at the intersection between the first reference plane, RP1, and the third reference plane, RP3. In the case where both reference planes RP1 and RP3 lie on the active cutting edge, and the vertical plane, PA1, lies at the intersection between the two reference planes, the base or x-dimension of the vertical plane, PA1, will also lie on the active cutting edge of the central cutting insert 100.

As a result of the position of the vertical plane, PA1, the coolant emitted from the flute coolant exit aperture 36 provides superior cooling to both the active cutting edge of the central cutting insert 100 and a thin web region 52 of the indexable drill assembly 10.

As shown in FIGS. 7 and 9, another aspect of the invention is that the central, longitudinal axis 42 of the projection 40 of the flute coolant exit aperture 36 for the central cutting insert 100 can be designed to intersect a horizontal plane, PB1, having a second area, A2, defined by a base (i.e., x-dimension) times a height (i.e., z-dimension). In other words: A2=base*height. It should be noted that the vertical plane, PA1, is substantially perpendicular to the horizontal plane, PB1. For the central cutting insert 100, the second area, A2, is defined by the following equation:

$$A2=(CL1*0.85)*(IC1/2) \quad \text{(Eq. 2)}$$

where,

CL1 is the cutting length (mm) of the central cutting insert 100 in a lateral direction, and IC1 is a diameter of the inscribed circle (IC) of the central cutting insert 100.

The horizontal plane, PB1, is collinear with a fourth reference plane, RP4, that lies on the first cutting point for the active cutting edge of the central cutting insert 100 and is substantially parallel to the central, longitudinal rotational axis, $C_L$. In addition, the horizontal plane, PB1, extends radially outward from the thin web region 52 of the indexable drill assembly 10. The base or x-dimension (i.e., CL1*0.85) of the horizontal plane, PB1, lies on or above the first reference plane, RP1, and has a height or z-dimension equal to one-half a diameter of an inscribed circle, IC, of the central cutting insert 100 (i.e., IC1/2). Alternatively, the base or x-dimension of the horizontal plane, PB1, lies at the intersection between the first reference plane, RP1, and the third reference plane, RP3. As a result of the position of the horizontal plane, PB1, the coolant emitted from the flute coolant exit aperture 36 provides superior cooling to both the active cutting edge of the central cutting insert 100 and the thin web region 52 of the indexable drill assembly 10.

Figure 10:
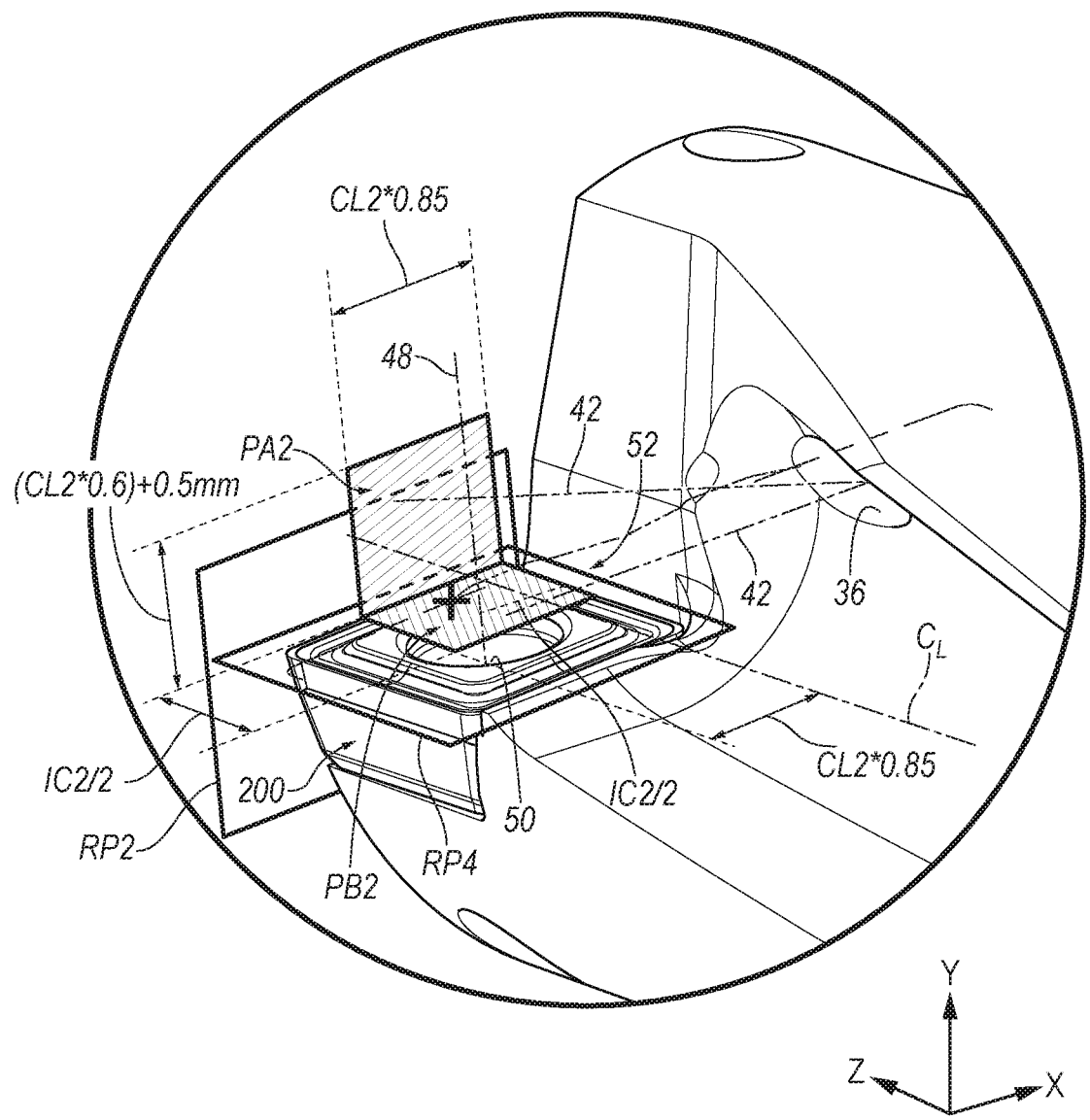
FIG. 10 is an enlarged rear perspective view of the drill assembly showing the central, longitudinal axis of the projection for peripheral cutting insert intersecting a vertical plane or a horizontal plane having an area defined by the cutting length in a lateral direction for a peripheral cutting insert according to an embodiment of the invention.

Referring now to FIG. 10, the central, longitudinal axis 42 of a projection 40 of the flute coolant exit aperture 36 for the peripheral cutting insert 200 can be designed to intersect a vertical plane, PA2, having a third area, A3, defined by a base (i.e., x-dimension) times a height (i.e., y-dimension). For the peripheral cutting insert 200, the third area, A3, can be defined by the following equation:

$$A3=(CL2*0.85)*((CL2*0.6)+0.5 \text{ mm}) \quad \text{(Eq. 3)}$$

where,

CL2 is a cutting length (mm) of the peripheral cutting insert 200 in the lateral direction (see FIGS. 1 and 2).

Figure 11:
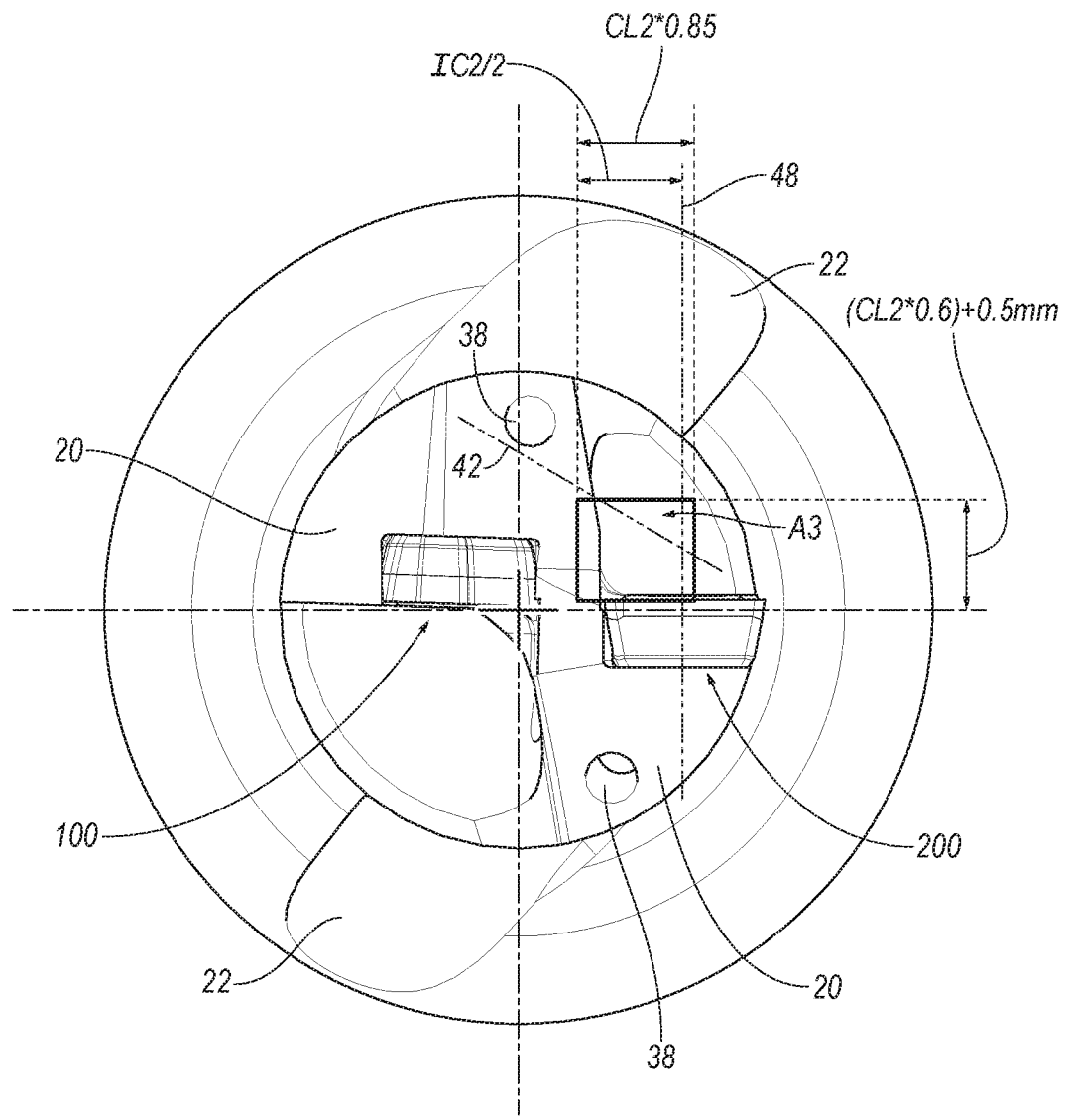
FIG. 11 is an enlarged front view of drill assembly showing the area and position of the vertical plane that is intersected by the projection of the flute coolant exit aperture for the peripheral cutting insert according to an embodiment of the invention.

As seen in FIGS. 10 and 11, the vertical plane, PA2, is collinear with a second reference plane, RP2, that lies on the first cutting point for the active cutting edge of the peripheral cutting insert 200 and is substantially perpendicular to the central, longitudinal rotational axis, $C_L$. The base or x-dimension (i.e., CL2*0.85) of the vertical plane, PA2, lies on or above a fourth reference plane, RP4, and has a height or y-dimension equal to (CL2*0.6)+0.5 mm. The fourth reference plane, RP4, lies on the active cutting edge of the peripheral cutting insert 200 and is substantially parallel to the central, longitudinal rotational axis, $C_L$. In addition, the first vertical plane, PA2, extends radially outward from the thin web region 52 of the indexable drill assembly 10.

In one embodiment, the base or x-dimension of the vertical plane, PA2, lies at the intersection between the second reference plane, RP2, and the fourth reference plane, RP4. In the case where both reference planes RP3 and RP4 lie on the active cutting edge, and the vertical plane, PA2, lies at the intersection between the two reference planes, the base or x-dimension of the vertical plane, PA2, will also lie on the active cutting edge of the peripheral cutting insert 200.

As a result of the position of the vertical plane, PA2, the coolant emitted from the flute coolant exit aperture 36 provides superior cooling to both the active cutting edge of the peripheral cutting insert 200 and the thin web region 52 of the indexable drill assembly 10.

Figure 12:
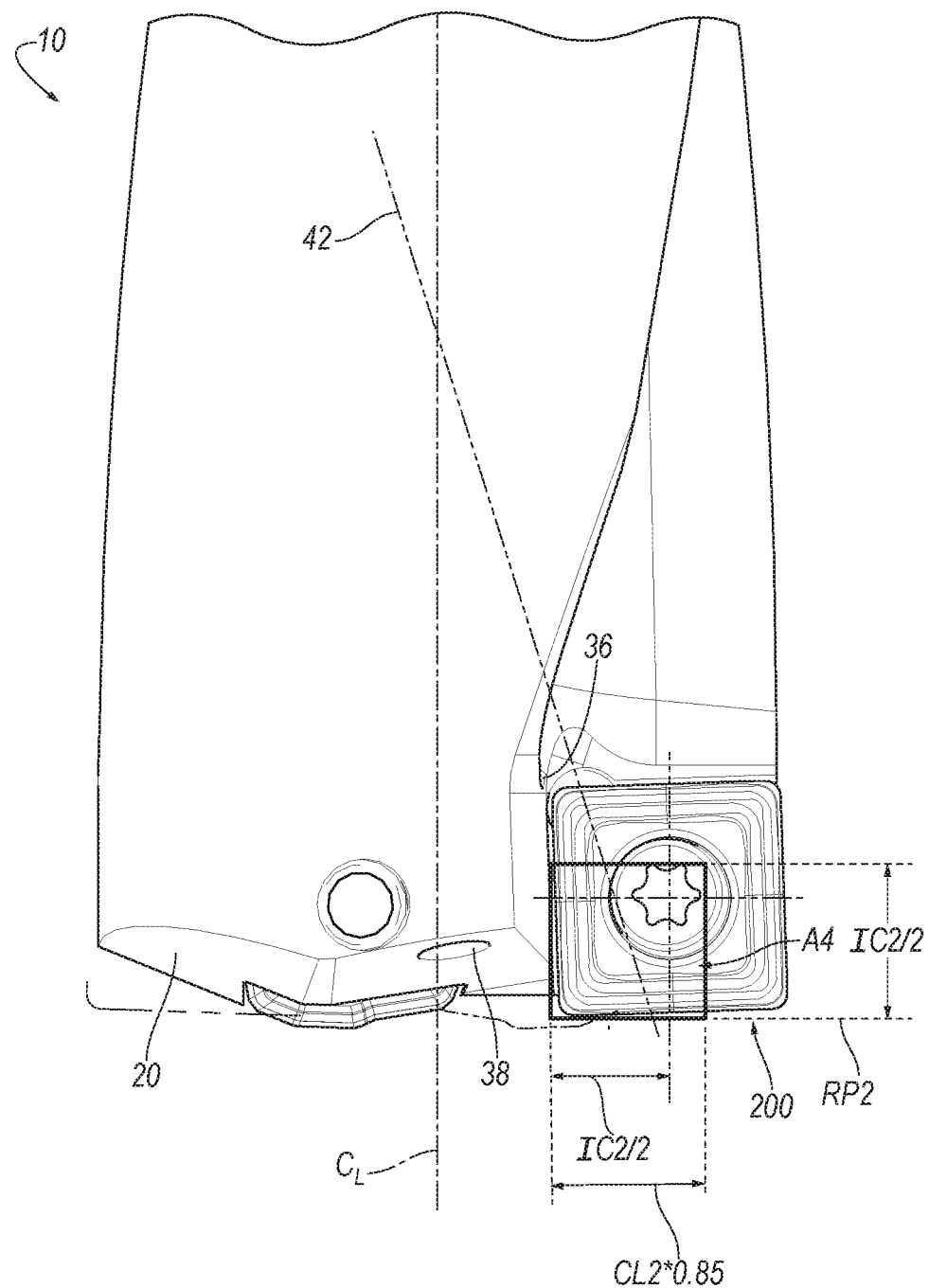
FIG. 12 is an enlarged top view of drill assembly showing the area and position of a horizontal plane that is intersected by the projection of the flute coolant exit aperture for the peripheral cutting insert according to an embodiment of the invention.

As shown in FIGS. 10 and 12, the central, longitudinal axis 42 of the projection 40 of the flute coolant exit aperture 36 for the peripheral cutting insert 200 can be designed to intersect a horizontal plane, PB2, having a fourth area, A4, defined by a base (i.e., x-dimension) times a height (i.e., y-dimension). In other words, A4=base*height. For the peripheral cutting insert 200, the fourth area, A4, can be defined by the following equation:

$$A4=(CL2*0.85)*(IC2/2) \quad \text{(Eq. 4)}$$

where,

CL2 is the cutting length (mm) of the peripheral cutting insert 200 in a lateral direction, and IC2 is a diameter (mm) of the inscribed circle (IC) of the peripheral cutting insert 200.

The horizontal plane, PB2, is collinear with the fourth reference plane, RP4, that lies on the first cutting point for the active cutting edge of the peripheral cutting insert 200 and is substantially parallel to the central, longitudinal rotational axis, $C_L$. In addition, the horizontal plane, PB2, extends radially outward from the thin web region 52 of the indexable drill assembly 10. The base or x-dimension (i.e., CL1*0.85) of the horizontal plane, PB2, lies on or above the second reference plane, RP2, and has a height or z-dimension equal to IC2/2. Alternatively, the base or x-dimension of the horizontal plane, PB2, lies at the intersection between the second reference plane, RP2, and the fourth reference plane, RP4. As a result of the position of the horizontal plane, PB2, the coolant emitted from the flute coolant exit aperture 36 provides superior cooling to both the active cutting edge of the central cutting insert 100 and the thin web region 52 of the indexable drill assembly 10.

As described above, the projection 40 of the flute coolant exit apertures 36 and the projection 44 of the front clearance face coolant exit apertures 38 of the indexable drill 10 significantly reduce excessive heat generation due to chip rubbing. As a result, failure of the drill body 12 at the thin web region 52 is avoided, thereby increasing tool life without significantly increasing cost of manufacture. In addition, the flow of chips is enhanced as compared to conventional indexable drills, thereby reducing noise level. Further, the front clearance face coolant exits 38 improve the supply of coolant to the cutting edges of the cutting inserts 100, 200, thereby increasing the life of the cutting inserts 100, 200. Overall, a more consistent hole size is achieved by the indexable drill assembly 10 of the invention.

The patents and publications referred to herein are hereby incorporated by reference.

Having described presently preferred embodiments the invention may be otherwise embodied within the scope of the appended claims.

The invention claimed is:

1. An indexable drill assembly (10), comprising:
a drill body (12) having a central longitudinal rotational axis ($C_L$), the drill body (12) comprising a shank portion (14) and a fluted cutting portion (16), the fluted cutting portion (16) having a front clearance face (20) and a plurality of flutes (22), the fluted cutting portion (16) includes a central insert pocket (24) proximate the front clearance face (20) and a central cutting insert (100) received in the central insert pocket (24), the central cutting insert (100) having an active cutting edge defining a cutting length (CL1) in a lateral direction extending radially from the central longitudinal rotational axis ($C_L$), the fluted cutting portion (16) also including a peripheral insert pocket (26) proximate the front clearance face (20) and a peripheral cutting insert (200) received in the peripheral insert pocket (26), the peripheral cutting insert (200) having an active cutting edge defining a cutting length (CL2) in a lateral direction extending radially from the central longitudinal rotational axis ($C_L$); and
a coolant system (30) comprising a plurality of primary coolant channels (32) extending entirely through the shank portion (14) and at least partially into the fluted cutting portion (16) of the drill body (12), and one or more secondary flute coolant channels (34) extending from one of the plurality of primary coolant channels (32) and terminating at a flute coolant exit aperture (36) formed in one of the plurality of flutes (22),
wherein the flute coolant exit aperture (36) produces a projection (40) of coolant having a central, longitudinal axis (42) that intersects one of the following:
1) a first vertical plane (PA1) defined by a two-dimensional surface having an area (A1) defined by the following equation:

$A1 = (CL1*0.85)*((CL1/\sqrt{2})+1.2 \text{ mm})$ where,
CL1 is the cutting length of the central cutting insert (100) in the lateral direction;
2) a first horizontal plane (PB1) defined by a two-dimensional surface having an area (A2) defined by the following equation:

$A2 = (CL1*0.85)*(IC1/2)$ where,
CL1 is the cutting length of the central cutting insert (100) in the lateral direction, and
IC1 is a diameter of an inscribed circle (IC) of the central cutting insert (100);
3) a second vertical plane (PA2) defined by a two-dimensional surface having an area (A3) defined by the following equation:

$A3 = (CL2*0.85)*((CL2*0.6)+0.5 \text{ mm})$, where,
CL2 is the cutting length of the peripheral cutting insert (200) in the lateral direction; and
4) a second horizontal plane (PB2) defined by a two-dimensional surface having an area (A4) defined by the following equation:

$A4 = (CL2*0.85)*(IC2/2)$ where,
CL2 is the cutting length of the peripheral cutting insert (200) in the lateral direction, and
IC2 is a diameter of an inscribed circle (IC) of the peripheral cutting insert (200).

2. The indexable drill assembly (10) of claim 1, wherein the first vertical plane (PA1) is collinear with respect to a first reference plane (RP1), the first reference plane (RP1) contacting a first cutting point of the central cutting insert (100) and is perpendicular with respect to the central, longitudinal rotational axis ($C_L$), and
wherein a base of the first vertical plane (PA1) lies on or is above a third reference plane (RP3), the third reference plane (RP3) contacting an active cutting edge of the central cutting insert (100) and is perpendicular with respect to the first vertical plane (PA1).

3. The indexable drill assembly (10) of claim 2, wherein the first vertical plane (PA1) extends radially outward from a thin web region (52) of the indexable drill assembly (10) for a distance equal to one-half the diameter of the inscribed circle (IC1) of the central cutting insert (100).

4. The indexable drill assembly (10) of claim 1, wherein the first horizontal plane (PB1) is collinear with respect to a third reference plane (RP3), the third reference plane (RP3) contacting a first cutting point of the central cutting insert (100) and is parallel with respect to the central, longitudinal rotational axis ($C_L$),
wherein a base of the first horizontal plane (PB1) lies on or is above a first reference plane (RP1), the first reference plane (RP1) contacting an active cutting edge of the central cutting insert (100) and is perpendicular with respect to the central, longitudinal rotational axis ($C_L$).

5. The indexable drill assembly (10) of claim 4, wherein the first horizontal plane (PB1) extends radially outward from a thin web region (52) of the indexable drill assembly (10) for a distance equal to one-half the diameter of the inscribed circle (IC1) of the central cutting insert (100).

6. The indexable drill assembly (10) of claim 1, wherein the second vertical plane (PA2) is collinear with respect to a second reference plane (RP2), the second reference plane (RP2) contacting a first cutting point of the peripheral cutting insert (200) and is perpendicular with respect to the central, longitudinal rotational axis ($C_L$),
wherein a base of the second vertical plane (PA2) lies on or is above a fourth reference plane (RP4), the fourth reference plane (RP4) contacting an active cutting edge of the peripheral cutting insert (200) and is parallel with respect to the central, longitudinal rotational axis ($C_L$).

7. The indexable drill assembly (10) of claim 6, wherein the second vertical plane (PA2) extends radially outward from a thin web region (52) of the indexable drill assembly (10) for a distance equal to one-half the diameter of the inscribed circle (IC2) of the peripheral cutting insert (200).

8. The indexable drill assembly (10) of claim 1, wherein the second horizontal plane (PB2) is collinear with respect to a fourth reference plane (RP4), the fourth reference plane (RP4) contacting a first cutting point of the peripheral cutting insert (200) and is parallel with respect to the central, longitudinal rotational axis ($C_L$), wherein a base of the second horizontal plane (PB2) lies on or is above a second reference plane (RP2), the second reference plane (RP2) contacting an active cutting edge of the peripheral cutting insert (200) and is perpendicular with respect to the central, longitudinal rotational axis ($C_L$).

9. The indexable drill assembly (10) of claim 4, wherein the second horizontal plane (PB2) extends radially outward from a thin web region (52) of the indexable drill assembly (10) for a distance equal to one-half the diameter of the inscribed circle (IC2) of the peripheral cutting insert (200).

* * * * *